United States Patent
Liu et al.

(10) Patent No.: US 12,262,385 B2
(45) Date of Patent: Mar. 25, 2025

(54) METHOD AND DEVICE IN NODES USED FOR LARGE-DELAY WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 339 days.

(21) Appl. No.: 17/748,012

(22) Filed: May 18, 2022

(65) Prior Publication Data

US 2022/0279510 A1 Sep. 1, 2022

Related U.S. Application Data

(63) Continuation of application No. PCT/CN2020/125045, filed on Oct. 30, 2020.

(30) Foreign Application Priority Data

Nov. 25, 2019 (CN) .......................... 201911166414.0

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0007* (2013.01); *H04W 72/0446* (2013.01); *H04W 72/0453* (2013.01)

(58) Field of Classification Search
CPC ............. H04W 72/21; H04W 72/0446; H04W 72/0453; H04W 56/00; H04W 72/20; H04L 5/0007; H04L 5/0094; H04L 5/0053
See application file for complete search history.

(56) References Cited

U.S. PATENT DOCUMENTS

2018/0091272 A1* 3/2018 Wang .................... H04L 5/0048
2020/0305127 A1* 9/2020 Huang .............. H04W 72/0453
(Continued)

FOREIGN PATENT DOCUMENTS

| CN | 109923793 A | 6/2019 |
|----|-------------|--------|
| CN | 110098892 A | 8/2019 |

(Continued)

OTHER PUBLICATIONS

English translation of International Search Report for PCT/CN2020/125045, mailed Feb. 1, 2021 (Year: 2021).*
(Continued)

*Primary Examiner* — Benjamin H Elliott, IV

(57) ABSTRACT

The present disclosure provides method and device in nodes used for wireless communication. A node receives first information; receives a first signaling; and transmits a first signal; the first information is used to determine a first characteristic parameter group, the first signaling is used to determine a target time length out of a first time length set, and the first characteristic parameter group comprises at least one of a type of a transmitter of the first information, a height of a transmitter of the first information or a common time offset; the first time length set is one of X candidate time length sets; the first characteristic parameter group is used to determine a first time length set out of the X candidate time length sets. The present disclosure ensures a successful uplink transmission.

20 Claims, 6 Drawing Sheets

| First characteristic parameter group | Subcarrier spacing | Candidate time length set (unit for measurement: slot) |
|---|---|---|
| $K_{offset} = q_1$ | 15kHz | $\{x_1, x_2, x_3, ..., x_n\}$ |
| $K_{offset} = q_1$ | 30kHz | $\{x_1, x_2, x_3, ..., x_n\}$ |
| $K_{offset} = q_1$ | 60kHz | $\{x_1+1, x_2-1, x_3+1, ..., x_n-1\}$ |
| $K_{offset} = q_1$ | 120kHz | $\{x_1+2, x_2-2, x_3+2, ..., x_n-2\}$ |
| $K_{offset} = q_2$ | 15kHz | $\{y_1, y_2, y_3, ..., y_n\}$ |
| $K_{offset} = q_2$ | 30kHz | $\{y_1, y_2, y_3, ..., y_n\}$ |
| $K_{offset} = q_2$ | 60kHz | $\{y_1+1, y_2-1, y_3+1, ..., y_n-1\}$ |
| $K_{offset} = q_2$ | 120kHz | $\{y_1+2, y_2-2, y_3+2, ..., y_n-2\}$ |
| $K_{offset} = q_3$ | 15kHz | $\{z_1, z_2, z_3, ..., z_n\}$ |
| $K_{offset} = q_3$ | 30kHz | $\{z_1, z_2, z_3, ..., z_n\}$ |
| $K_{offset} = q_3$ | 60kHz | $\{z_1+1, z_2-1, z_3+1, ..., z_n-1\}$ |
| $K_{offset} = q_3$ | 120kHz | $\{z_1+2, z_2-2, z_3+2, ..., z_n-2\}$ |

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2020/0359386 A1* | 11/2020 | Liu | H04L 1/00 |
| 2021/0099984 A1* | 4/2021 | Liu | H04W 72/12 |
| 2021/0168814 A1* | 6/2021 | Chen | H04W 72/02 |
| 2021/0337518 A1* | 10/2021 | Liu | H04W 72/0446 |
| 2022/0086918 A1* | 3/2022 | Liu | H04W 24/08 |
| 2022/0279510 A1* | 9/2022 | Liu | H04W 72/0453 |
| 2022/0330064 A1* | 10/2022 | Liu | H04W 24/08 |
| 2022/0330330 A1* | 10/2022 | Liu | H04W 56/004 |
| 2023/0155669 A1* | 5/2023 | Liberg | H04W 56/0045 370/316 |

FOREIGN PATENT DOCUMENTS

| | | |
|---|---|---|
| CN | 110167186 A | 8/2019 |
| CN | 110301143 A | 10/2019 |
| WO | 2018033009 A1 | 2/2018 |

OTHER PUBLICATIONS

"NTN control procedure for physical layer"; OPPO; 3GPP TSG RAN WG1 #98bis R1-1910386 Chongqing, China, Oct. 14-20, 2019 (Year: 2019).*

"Discussion on delay-tolerant HARQ for NTN"; Sony; 3GPP TSG RAN WG1 Meeting #98bis R1-1910748 Chongqing, China, Oct. 14-20, 2019 (Year: 2019).*

"RACH Procedure and UL Timing Control for NTN"; Qualcomm; 3GPP TSG RAN WG1 #98bis R1-1911115 Chongqing, China, Oct. 14-20, 2019 (Year: 2019).*

"Doppler Compensation, Uplink Timing Advance, Random Access and UE Location in NTN"; Nokia et al.; 3GPP TSG RAN WG1 Meeting #98bis R1-1911220 Chongqing, China, Oct. 14-20, 2019 (Year: 2019).*

"Chairman's notes of AI 7.2.5 Study on Solutions for NR to Support Non-Terrestrial Network (NTN)"; Ericsson; 3GPP TSG-RAN WG1 Meeting #98bis Tdoc R1-1911510 Chongqing, China, Oct. 14-20, 2019 (Year: 2019).*

"Summary#2 of 7.2.5.4 on more delay-tolerant re-transmission mechanisms in NR-NTN"; Mediatek; 3GPP TSG RAN WG1 Meeting #98bis R1-1911560 Chongqing, China, Oct. 14-20, 2019 (Year: 2019).*

First Search Report of Chinses patent application No. CN201911166414.0 dated Apr. 20, 2022.

ISR received in application No. PCT/CN2020/125045 dated Feb. 1, 2021.

Notification to Grant Patent Right for Invention of Chinses patent application No. CN201911166414.0 dated Apr. 26, 2022.

3rd Generation Partnership Project;Technical Specification Group Radio Access Network;Solutions for NR to support hon-terrestrial networks (NTN) (Release 16)3GPP TR 38.821 V0.9.0 Nov. 18, 2019.

ETRI Considerations on uplink timing advance and RACH procedure for Ntn 3GPP TSG RAN WG1 #97 R1-1907039 May 3, 2019.

Samsung Uplink timing advance/RACH procedure and Initial Access for Ntn 3GPP TSG RAN WG1 Meeting #99 R1-1912470 Nov. 7, 2019.

* cited by examiner

| Index of configuration combination | Time interval length (unit for measurement: slot) | Index of start symbol | Occupied time length (unit for measurement: symbol) |
|---|---|---|---|
| 1 | $j+1$ | 0 | 14 |
| 2 | $j+2$ | 0 | 12 |
| 3 | $j+3$ | 0 | 10 |
| 4 | $j+4$ | 2 | 10 |
| 5 | $j+5$ | 4 | 10 |
| 6 | $j+6$ | 4 | 8 |
| 7 | $j+6$ | 4 | 6 |
| 8 | $j+7$ | 0 | 14 |
| 9 | $j+7$ | 0 | 12 |
| 10 | $j+8$ | 0 | 10 |
| 11 | $j+8$ | 0 | 14 |
| 12 | $j+9$ | 0 | 12 |
| 13 | $j+9$ | 0 | 10 |
| 14 | $j$ | 8 | 6 |
| 15 | $j+10$ | 0 | 14 |
| 16 | $j+10$ | 0 | 10 |

| First characteristic parameter group | Subcarrier spacing | Candidate time length set (unit for measurement: slot) |
|---|---|---|
| $K_{offset} = q_1$ | 15kHz | $\{x_1, x_2, x_3, ..., x_n\}$ |
| $K_{offset} = q_1$ | 30kHz | $\{x_1, x_2, x_3, ..., x_n\}$ |
| $K_{offset} = q_1$ | 60kHz | $\{x_1+1, x_2+1, x_3+1, ..., x_n+1\}$ |
| $K_{offset} = q_1$ | 120kHz | $\{x_1+2, x_2+2, x_3+2, ..., x_n+2\}$ |
| $K_{offset} = q_2$ | 15kHz | $\{y_1, y_2, y_3, ..., y_n\}$ |
| $K_{offset} = q_2$ | 30kHz | $\{y_1, y_2, y_3, ..., y_n\}$ |
| $K_{offset} = q_2$ | 60kHz | $\{y_1+1, y_2+1, y_3+1, ..., y_n+1\}$ |
| $K_{offset} = q_2$ | 120kHz | $\{y_1+2, y_2+2, y_3+2, ..., y_n+2\}$ |
| $K_{offset} = q_3$ | 15kHz | $\{z_1, z_2, z_3, ..., z_n\}$ |
| $K_{offset} = q_3$ | 30kHz | $\{z_1, z_2, z_3, ..., z_n\}$ |
| $K_{offset} = q_3$ | 60kHz | $\{z_1+1, z_2+1, z_3+1, ..., z_n+1\}$ |
| $K_{offset} = q_3$ | 120kHz | $\{z_1+2, z_2+2, z_3+2, ..., z_n+2\}$ |

FIG. 9

| Subcarrier spacing | Time offset (unit for measurement: slot) |
|---|---|
| 15kHz | 2 |
| 30kHz | 3 |
| 60kHz | 4 |
| 120kHz | 6 |

FIG. 10

METHOD AND DEVICE IN NODES USED FOR LARGE-DELAY WIRELESS COMMUNICATION

CROSS REFERENCE TO RELATED APPLICATIONS

This application is the continuation of International Patent Application No. PCT/CN2020/125045, filed on Oct. 30, 2020, which claims the priority benefit of Chinese Patent Application No. 201911166414.0, filed on Nov. 25, 2019, the full disclosure of which is incorporated herein by reference.

BACKGROUND

Technical Field

The present disclosure relates to transmission methods and devices in wireless communication systems, and in particular to a transmission scheme and device of large delay in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The work item of NR was approved at 3GPP RAN #75th plenary to standardize NR.

To ensure better adaptability to various application scenarios and requirements, 3GPP RAN #75th plenary also approved a study item of NR-backed Non-Terrestrial Networks (NTN) starting with Release (R)15. It was decided to start studying solutions in NTN networks at 3GPP RAN #79 plenary and then started a WI to standardize related techniques in R16 or R17.

SUMMARY

In NTN networks or networks similar to NTN with large transmission delay and large transmission delay differences, large transmission delay differences and requirement for uplink and downlink synchronization transmission may lead to the existing (e.g., NR 5G R16) design based on conventional terrestrial networks unable to be reused, thus requiring a new design to support the large transmission delay to ensure normal communications.

The application provides a solution to the problem of existing designs that do not work or do not work efficiently due to large delay and large delay differences in large delay networks. It should be noted that though the present disclosure only took the NTN scenario for example in the statement above; this application is also applicable to other scenarios (such as other large latency networks) other than NTN confronting similar problems, where similar technical effects can be achieved. Additionally, the adoption of a unified solution for various scenarios, including but not limited to scenarios of NTN, contributes to the reduction of hardware complexity and costs. If no conflict is incurred, embodiments in a first node in the present disclosure and the characteristics of the embodiments are also applicable to a second node, and vice versa. Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:

receiving first information, the first information being used to determine a first characteristic parameter group;

receiving a first signaling, the first signaling being used to determine a target time length out of a first time length set; and transmitting a first signal;

herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, by introducing the X candidate time length sets, a configuration of the first time length set under different delay conditions is supported, so that the network is enabled to configure a delay of uplink and downlink transition that can be scheduled according to actual delay conditions, which supports scheduling in large delay networks on the premise of ensuring scheduling flexibility, thus avoiding transmission failures caused by that a delay between uplink and downlink cannot support a wide range of transmission delay differences.

In one embodiment, the first characteristic parameter group is used to determine the first time length set out of the X candidate time length sets, which supports implicitly acquiring a set of delay parameters that can be scheduled or configured based on delay conditions of the network or orbit information of satellite or altitude information of satellite, thus avoiding an introduction of extra signaling overhead while effectively solving the failure to work properly during uplink and downlink transition that may be caused by a wide range of transmission delay differences.

In one embodiment, the first time length set is determined by the first characteristic parameter group rather than a single time length, so that the network can schedule according to an actual transmission delay between different UEs, avoiding the problem of an unnecessary scheduling delay incurred by always performing scheduling for a largest delay difference.

According to one aspect of the present disclosure, the above method is characterized in that the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set.

In one embodiment, each of the P configuration combinations comprises at least a time interval length among a time interval length, an index of a start symbol in a slot to which it belongs or an occupied time length, so as to support jointly indicating the time interval length, the index of the start symbol in a slot to which it belongs, and the occupied time length, thus reducing the overhead of a scheduling signaling while ensuring the scheduling flexibility.

According to one aspect of the present disclosure, the above method is characterized in also comprising:
receiving second information;
herein, the second information is used to determine the P configuration combinations.

According to one aspect of the present disclosure, the above method is characterized in that time lengths in the first time length set are sorted in order of length, an absolute value of a difference value between any two adjacent time lengths in the first time length set is equal to a first step-size, the first step-size is equal to a positive integral number of a first slot length, and the first slot length is equal to a time length of a slot to which an Orthogonal Frequency Division Multiplexing (OFDM) symbol occupied by the first signal in time domain belongs.

In one embodiment, an absolute value of a difference value between any two adjacent time lengths in the first time length set is equal to a first step-size, so as to ensure the consistency of the maximum scheduling delay overhead of UEs in different transmission delay zones, thus ensuring the fairness of delays for different UEs.

According to one aspect of the present disclosure, the above method is characterized in that a subcarrier spacing (SCS) of a subcarrier occupied by the first signal in frequency domain is used to determine the first time length set out of the X candidate time length sets.

According to one aspect of the present disclosure, the above method is characterized in that the first signal is used for a random access, an SCS of a subcarrier occupied by the first signal in frequency domain is used to determine a first time offset, and the first time offset is used to determine a time interval length between a time for receiving the first signaling and the time for transmitting the first signal.

According to one aspect of the present disclosure, the above method is characterized in also comprising:
receiving a second signal; and
transmitting a third signal;
herein, the common time offset is used to determine a time interval length between an end time for receiving the second signal and a start time for transmitting the third signal, and the third signal carries uplink control information (UCI); the second signal is different from the first signaling, and the third signal is different from the first signal.

According to one aspect of the present disclosure, the above method is characterized in also comprising:
when the first characteristic parameter group does not comprise the common time offset, receiving third information;
herein, the third information is used to determine the common time offset.

The present disclosure provides a method in a second node for wireless communications, comprising:
transmitting first information, the first information being used to determine a first characteristic parameter group;
transmitting a first signaling, the first signaling being used to determine a target time length out of a first time length set; and
receiving a first signal;
herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

According to one aspect of the present disclosure, the above method is characterized in that the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set.

According to one aspect of the present disclosure, the above method is characterized in also comprising:
transmitting second information;
herein, the second information is used to determine the P configuration combinations.

According to one aspect of the present disclosure, the above method is characterized in that time lengths in the first time length set are sorted in order of length, an absolute value of a difference value between any two adjacent time lengths in the first time length set is equal to a first step-size, the first step-size is equal to a positive integral number of a first slot length, and the first slot length is equal to a time length of a slot to which an OFDM symbol occupied by the first signal in time domain belongs.

According to one aspect of the present disclosure, the above method is characterized in that an SCS of a subcarrier occupied by the first signal in frequency domain is used to determine the first time length set out of the X candidate time length sets.

According to one aspect of the present disclosure, the above method is characterized in that the first signal is used for a random access, an SCS of a subcarrier occupied by the first signal in frequency domain is used to determine a first time offset, and the first time offset is used to determine a time interval length between a time for receiving the first signaling and a time for transmitting the first signal.

According to one aspect of the present disclosure, the above method is characterized in also comprising:
transmitting a second signal; and
receiving a third signal;
herein, the common time offset is used to determine a time interval length between an end time for receiving the second signal and a start time for transmitting the third signal, and the third signal carries UCI; the second signal is different from the first signaling, and the third signal is different from the first signal.

According to one aspect of the present disclosure, the above method is characterized in also comprising:

when the first characteristic parameter group does not comprise the common time offset, transmitting third information;

herein, the third information is used to determine the common time offset.

The present disclosure provides a first node for wireless communications, comprising:

a first receiver, receiving first information, the first information being used to determine a first characteristic parameter group;

a second receiver, receiving a first signaling, the first signaling being used to determine a target time length out of a first time length set; and a first transmitter, transmitting a first signal;

herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

The present disclosure provides a second communication node for wireless communications, comprising:

a second transmitter, transmitting first information, the first information being used to determine a first characteristic parameter group;

a third transmitter, transmitting a first signaling, the first signaling being used to determine a target time length out of a first time length set; and a third receiver, receiving a first signal;

herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the method in the present disclosure is advantageous in the following aspects:

the method in the present disclosure enables the network to configure a delay of uplink and downlink transition that can be scheduled according to actual delay conditions, which supports scheduling in large delay networks while ensuring the scheduling flexibility, thus avoiding transmission failures caused by that delay between uplink and downlink cannot support a wide range of transmission delay differences;

the method in the present disclosure supports implicitly acquiring a set of delay parameters that can be scheduled or configured based on delay conditions of the network or orbit information of satellite or altitude information of satellite, thus avoiding an introduction of extra signaling overhead while effectively solving the failure to work properly during uplink and downlink transition that may be caused by a wide range of transmission delay differences;

by adopting the method in the present disclosure, the network can schedule according to an actual transmission delay between different UEs, avoiding the problem of unnecessary scheduling delay incurred by always performing scheduling for a largest delay difference;

the method in the present disclosure supports jointly indicating a time interval length, an index of a start symbol in a slot to which it belongs, and an occupied time length to reduce the scheduling signaling overhead while ensuring the scheduling flexibility;

the method in the present disclosure ensures that a maximum scheduling delay overhead is the same for UEs in different transmission delay zones, ensuring fairness of delay for different UEs.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of X candidate time length sets according to one embodiment of the pre sent disclosure;

FIG. 10 illustrates a schematic diagram of a first time offset according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
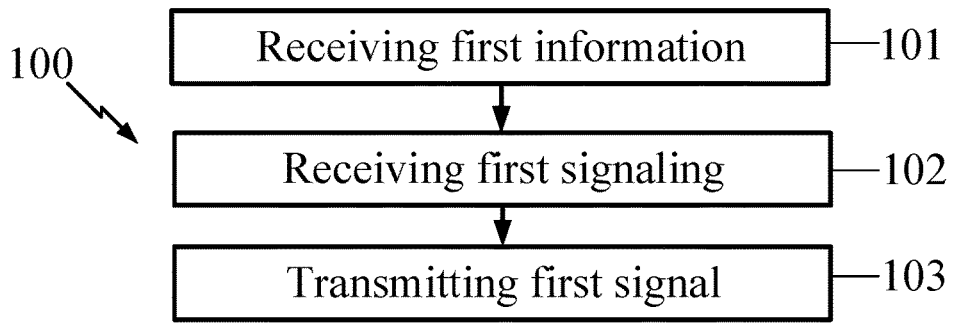
FIG. 1 illustrates a flowchart of first information, a first signaling and a first signal according to one embodiment of the present disclosure.

Embodiment 1 illustrates a flowchart of first information, a first signaling and a first signal according to one embodiment of the present disclosure, as shown in FIG. 1. In FIG. 1, each box represents a step. Particularly, the sequential order of steps in these boxes does not necessarily mean that the steps are chronologically arranged.

In embodiment 1, a first node in the present disclosure receives first information in step 101, and the first information is used to determine a first characteristic parameter group; receives a first signaling in step 102, the first signaling is used to determine a target time length out of a first time length set; and transmits a first signal in step 103; herein, the first characteristic parameter group comprises at least one of a type of a transmitter of the first information, a height of a transmitter of the first information or a common time offset;

the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the first node is in a Radio Resource Control (RRC)_IDLE state when transmitting the first signal.

In one embodiment, the first node is in an RRC_CONNECTED state when transmitting the first signal.

In one embodiment, the first node is in an RRC_INACTIVE state when transmitting the first signal.

In one embodiment, the first information is transmitted via an air interface.

In one embodiment, the first information is transmitted via a radio interface.

In one embodiment, the first information is transmitted by a higher-layer signaling.

In one embodiment, the first information is transmitted by a physical-layer signaling.

In one embodiment, the first information comprises all or part of a higher-layer signaling.

In one embodiment, the first information comprises all or part of a physical-layer signaling.

In one embodiment, the first information comprises all or partial Information Elements (IEs) in an RRC signaling.

In one embodiment, the first information comprises all or partial fields in an IE in an RRC signaling.

In one embodiment, the first information comprises all or partial fields in a Medium Access Control (MAC) layer signaling.

In one embodiment, the first information comprises all or part of a Master Information Block (MIB).

In one embodiment, the first information comprises all or part of a System Information Block (SIB).

In one embodiment, the first information comprises all or part of a Medium Access Control (MAC) Control Element (CE).

In one embodiment, the first information comprises all or part of a MAC header.

In one embodiment, the first information is transmitted through a Downlink Shared Channel (DL-SCH).

In one embodiment, the first information is transmitted through a Physical Downlink Shared Channel (PDSCH).

In one embodiment, the first information is broadcast.

In one embodiment, the first information is Cell-Specific.

In one embodiment, the first information is UE-specific.

In one embodiment, the first information is UE group-specific.

In one embodiment, the first information is footprint-specific.

In one embodiment, the first information is Beam-Specific.

In one embodiment, the first signal is geographic zone-specific.

In one embodiment, the first information comprises all or partial fields of a Downlink Control Information (DCI) signaling.

In one embodiment, the above phrase of "the first information being used to determine a first characteristic parameter group" includes the following meaning: the first information is used by the first node in the present disclosure to determine the first characteristic parameter group.

In one embodiment, the above phrase of "the first information being used to determine a first characteristic parameter group" includes the following meaning: the first information is used to directly indicate the first characteristic parameter group.

In one embodiment, the above phrase of "the first information being used to determine a first characteristic parameter group" includes the following meaning: the first information is used to indirectly indicate the first characteristic parameter group.

In one embodiment, the above phrase of "the first information being used to determine a first characteristic parameter group" includes the following meaning: the first information is used to explicitly indicate the first characteristic parameter group.

In one embodiment, the above phrase of "the first information being used to determine a first characteristic parameter group" includes the following meaning: the first information is used to implicitly indicate the first characteristic parameter group.

In one embodiment, the first signaling is transmitted via an air interface.

In one embodiment, the first signaling is transmitted via a radio interface.

In one embodiment, the first signaling is transmitted via a Uu interface.

In one embodiment, the first signaling is a physical-layer signaling.

In one embodiment, the first signaling is transmitted through a Physical Downlink Control Channel (PDCCH).

In one embodiment, the first signaling comprises all or partial fields in DCI.

In one embodiment, the first signaling comprises all or partial fields in DCI with a given DCI format.

In one embodiment, the first signaling is a higher-layer signaling.

In one embodiment, the first signaling is an RRC signaling.

In one embodiment, the first signaling is a MAC layer signaling.

In one embodiment, the first signaling is a signaling used to configure a Semi-Persistent Scheduling (SPS).

In one embodiment, the first signaling is an Uplink Grant in a Random Access Response (RAR).

In one embodiment, the first signaling is an Uplink Grant in MsgB.

In one embodiment, the first signaling is a field "PDSCH-to-HARQ_feedback timing indicator" in MsgB.

In one embodiment, the first signaling is a field "PDSCH-to-HARQ_feedback timing indicator" in DCI.

In one embodiment, the first signaling is a DCI scheduling a PDSCH.

In one embodiment, the first signaling is a DCI scheduling a Physical Uplink Shared Channel (PUSCH).

In one embodiment, the first signaling is a field "CSI" in a DCI.

In one embodiment, the above phrase of "the first signaling being used to determine a target time length out of a first time length set" includes the following meaning: the first signaling is used by the first node in the present disclosure to determine the target time length out of the first time length set.

In one embodiment, the above phrase of "the first signaling being used to determine a target time length out of a first time length set" includes the following meaning: the first signaling is used to indicate the target time length directly out of the first time length set.

In one embodiment, the above phrase of "the first signaling being used to determine a target time length out of a first time length set" includes the following meaning: the first signaling is used to indicate the target time length indirectly out of the first time length set.

In one embodiment, the above phrase of "the first signaling being used to determine a target time length out of a first time length set" includes the following meaning: the first signaling is used to indicate the target time length explicitly out of the first time length set.

In one embodiment, the above phrase of "the first signaling being used to determine a target time length out of a first time length set" includes the following meaning: the first signaling is used to indicate the target time length implicitly out of the first time length set.

In one embodiment, the first signal is a baseband signal.

In one embodiment, the first signal is a radio-frequency signal.

In one embodiment, the first signal is transmitted via an air interface.

In one embodiment, the first signal is transmitted via a radio interface.

In one embodiment, the first signal carries Msg3 (random access information 3).

In one embodiment, the first signal is used for a random access procedure.

In one embodiment, the first signal carries a retransmission of Msg3.

In one embodiment, the first signal carries a first transmission of Msg3.

In one embodiment, the first signal carries a retransmission of uplink transmission scheduled by MsgB.

In one embodiment, the first signal carries a first transmission of uplink transmission scheduled by MsgB.

In one embodiment, the first signal is an uplink transmission later than Msg3.

In one embodiment, the first signal is an uplink transmission of the first node after completing a random access procedure.

In one embodiment, the first signal is transmitted through an Uplink Shared Channel (UL-SCH).

In one embodiment, the first signal is transmitted through a Physical Uplink Shared Channel (PUSCH).

In one embodiment, the first signal is transmitted through a Physical Uplink Control Channel (PUCCH).

In one embodiment, the first signal is transmitted through a Sounding Reference Signal (SRS).

In one embodiment, the first signal is transmitted through an Uplink Demodulation Reference Signal (UL DMRS).

In one embodiment, the first signal occupies at least one subcarrier in frequency domain.

In one embodiment, the first signal occupies more than one subcarrier in frequency domain, and SCSs of any two subcarriers occupied by the first radio signal in frequency domain are equal.

In one embodiment, the first signal does not carry UCI.

In one embodiment, the first signal only carries higher-layer information.

In one embodiment, all or partial bits in a Transport Block (TB) are used to generate the first signal.

In one embodiment, the first signal does not carry physical-layer information.

In one embodiment, the first signal carries UCI of a physical layer.

In one embodiment, the first signal carries a Hybrid Automatic Repeat Request-Acknowledgement (HARQ-ACK).

In one embodiment, the first signal carries Channel Status Information (CSI).

In one embodiment, all or part of a bit block carrying UCI is used to generate the first signal.

In one embodiment, a waveform adopted by the first signal is an OFDM.

In one embodiment, a waveform adopted by the first signal is a Discrete Fourier Transform-Spread-Orthogonal Frequency Division Multiplexing (DFT-s-OFDM).

In one embodiment, the above phrase of "the first characteristic parameter group comprising at least one of a type of a transmitter of the first information, a height of a transmitter of the first information or a common time offset" includes the following meaning: the first characteristic parameter group comprises a type of a transmitter of the first information, a height of a transmitter of the first information and the common time offset.

In one embodiment, the above phrase of "the first characteristic parameter group comprising at least one of a type of a transmitter of the first information, a height of a transmitter of the first information or a common time offset" includes the following meaning: the first characteristic parameter group comprises a type of a transmitter of the first information and the common time offset.

In one embodiment, the above phrase of "the first characteristic parameter group comprising at least one of a type of a transmitter of the first information, a height of a transmitter of the first information or a common time offset" includes the following meaning: the first characteristic parameter group comprises a height of a transmitter of the first information and the common time offset.

In one embodiment, the above phrase of "the first characteristic parameter group comprising at least one of a type of a transmitter of the first information, a height of a transmitter of the first information or a common time offset"

includes the following meaning: the first characteristic parameter group only comprises a type of a transmitter of the first information.

In one embodiment, the above phrase of "the first characteristic parameter group comprising at least one of a type of a transmitter of the first information, a height of a transmitter of the first information or a common time offset" includes the following meaning: the first characteristic parameter group only comprises a height of a transmitter of the first information.

In one embodiment, the above phrase of "the first characteristic parameter group comprising at least one of a type of a transmitter of the first information, a height of a transmitter of the first information or a common time offset" includes the following meaning: the first characteristic parameter group only comprises the common time offset.

In one embodiment, a type of a transmitter of the first information indicates whether the transmitter of the first information is a Terrestrial Network (TN) node or a Non-Terrestrial Network (NTN) node.

In one embodiment, a type of a transmitter of the first information is a type indicating a satellite to which a transmitter of the first information belongs.

In one embodiment, a type of a transmitter of the first information is one of a Low-Earth Orbit (LEO) satellite, a Medium-Earth Orbit (MEO) satellite, a Geostationary Earth Orbit (GEO) satellite, an Unmanned Aircraft Systems Platform (UAS) and a High Elliptical Orbit (HEO).

In one embodiment, a type of a transmitter of the first information indicates whether the transmitter of the first information is a satellite or a UAS.

In one embodiment, a height of a transmitter of the first information is measured by m.

In one embodiment, a height of a transmitter of the first information is measured by km.

In one embodiment, a height of a transmitter of the first information is represented by transmission delay.

In one embodiment, a height of a transmitter of the first information refers to a height of a transmitter of the first information based on a horizontal plane.

In one embodiment, a height of a transmitter of the first information refers to a distance of the transmitter of the first information to a nadir.

In one embodiment, the common time offset is $K_{offset}$.

In one embodiment, the common time offset is an extra scheduling delay between a DCI and a scheduled PUSCH of NTN compared to TN.

In one embodiment, the common time offset is an extra delay between a PDSCH and an associated HARQ-ACK of NTN compared to TN.

In one embodiment, the common time offset is an extra delay between a DCI and a triggered CSI reporting of NTN compared to TN.

In one embodiment, the common time offset is an extra delay between a CSI reporting and a CSI reference resource of NTN compared to TN.

In one embodiment, the common time offset is measured by ms.

In one embodiment, the common time offset is measured by s.

In one embodiment, the common time offset is represented by a number of OFDM symbols.

In one embodiment, the common time offset is represented by a number of OFDM symbols of an SCS.

In one embodiment, the common time offset is related to a prorogation delay from a transmitter of the first information to the first node.

In one embodiment, the common time offset is related to a prorogation delay from a transmitter of the first information to a nadir.

In one embodiment, the common time offset is related to a Round Trip Time (RTT) from a transmitter of the first information to the first node.

In one embodiment, the common time offset is related to an RTT from a transmitter of the first information to a nadir.

In one embodiment, any two time lengths in the first time length set are not equal.

In one embodiment, there exists two time lengths in the first time length set being equal.

In one embodiment, any time length in the first time length set is represented by a number of OFDM symbols.

In one embodiment, any time length in the first time length set is represented by a number of OFDM symbols corresponding to an SCS of a subcarrier occupied by the first signal in frequency domain.

In one embodiment, any time length in the first time length set is represented by a number of slots.

In one embodiment, any time length in the first time length set is represented by a number of slots corresponding to an SCS of a subcarrier occupied by the first signal in frequency domain.

In one embodiment, any time length in the first time length set is represented by a number of Tcs, where Tc=1/(480000*4096) s.

In one embodiment, each time length in the first time length set is greater than 0.

In one embodiment, each time length in the first time length set is not less than 0, and there exists one time length in the first time length set being equal to 0.

In one embodiment, each time length in the first time length set is a possible value of k2 in a PUSCH time domain resource allocation.

In one embodiment, each time length in the first time length set is equal to a possible value of a sum of k0 in a PUSCH time domain resource allocation and k in PDSCH-to-HARQ_feedback timing.

In one embodiment, each time length in the first time length set is a possible value of a scheduling time offset between a PDCCH triggering a CSI report and a CSI reporting.

In one embodiment, time interval lengths comprised in the first time length set are respectively 1 slot, 2 slots, 3 slots, 4 slots, 5 slots, 6 slots, 7 slots and 8 slots.

In one embodiment, any two of the X candidate time length sets are not the same.

In one embodiment, there exist two of the X candidate time length sets being the same.

In one embodiment, there exist two of the X candidate time length sets being different.

In one embodiment, any time length comprised in any of the X candidate time length sets is greater than 0.

In one embodiment, there exists a time length in one of the X candidate time length sets being equal to 0.

In one embodiment, any time length comprised in any of the X candidate time length sets is represented by a number of OFDM symbols.

In one embodiment, any time length comprised in any of the X candidate time length sets is represented by a number of OFDM symbols corresponding to an SCS of a subcarrier occupied by the first signal in frequency domain.

In one embodiment, any time length comprised in any of the X candidate time length sets is represented by a number of slots.

In one embodiment, any time length comprised in any of the X candidate time length sets is represented by a number of slots corresponding to an SCS of a subcarrier occupied by the first signal in frequency domain.

In one embodiment, any time length comprised in any of the X candidate time length is represented by a number of Tcs, where Tc=1/(480000*4096) s.

In one embodiment, X is equal to 2.

In one embodiment, X is equal to a number of satellite types supported by network plus 1.

In one embodiment, X is configurable.

In one embodiment, X is greater than 2.

In one embodiment, the X candidate time length sets are predefined.

In one embodiment, the X candidate time length sets are configurable.

In one embodiment, the X candidate time length sets are release specific.

In one embodiment, for UEs in Release 17 (R17) and after the R17, the X candidate time length sets are visible.

In one embodiment, the X candidate time length sets are fixed.

In one embodiment, the X candidate time length sets are respectively for X possible types of transmitters of the first information.

In one embodiment, the X candidate time length sets are respectively for X possible heights of transmitters of the first information.

In one embodiment, the X candidate time length sets are respectively for X possible the common time offsets.

In one embodiment, the above phrase of "the first characteristic parameter group being used to determine the first time length set out of the X candidate time length sets" includes the following meaning: the first characteristic parameter group is used by the first node in the present disclosure to determine a first time length set out of the X candidate time length sets.

In one embodiment, the above phrase of "the first characteristic parameter group being used to determine the first time length set out of the X candidate time length sets" includes the following meaning: for a given an SCS of a subcarrier occupied by the first signal in frequency domain, the first characteristic parameter group is used to determine the first time length set out of the X candidate time length sets.

In one embodiment, the above phrase of "the first characteristic parameter group being used to determine the first time length set out of the X candidate time length sets" includes the following meaning: the X candidate time length sets respectively correspond to X candidate characteristic parameter groups, the first characteristic parameter group is one of the X candidate characteristic parameter groups, and the first time length set is one of the X candidate time length sets corresponding to the first characteristic parameter group.

In one embodiment, the above phrase of "the first characteristic parameter group being used to determine the first time length set out of the X candidate time length sets" includes the following meaning: the first characteristic parameter group is used to determine a first time length set out of the X candidate time length sets according to a mapping relation.

In one embodiment, the above phrase of "the first characteristic parameter group being used to determine the first time length set out of the X candidate time length sets" includes the following meaning: the first characteristic parameter group is used to determine a first time length set out of the X candidate time length sets according to a table corresponding relation.

In one embodiment, a time for receiving the first signaling refers to an end time for receiving the first signaling.

In one embodiment, a time for receiving the first signaling refers to a start time for receiving the first signaling.

In one embodiment, a time for receiving the first signaling refers to a latest boundary reception time of a slot to which a latest OFDM symbol occupied by the first signaling in time domain belongs.

In one embodiment, a time for receiving the first signaling refers to an end time for receiving a slot to which a latest OFDM symbol occupied by the first signaling in time domain belongs.

In one embodiment, a time for receiving the first signaling refers to an SCS of a subcarrier occupied by the first signaling in frequency domain being equal to a first SCS, an end time for receiving a slot adopting the first SCS to which a latest OFDM symbol occupied by the first signaling in time domain belongs.

In one embodiment, a time for receiving the first signaling refers to an SCS of a subcarrier occupied by the first signal in frequency domain being equal to a second SCS, an end time for receiving a slot adopting the second SCS to which a latest OFDM symbol occupied by the first signaling in time domain belongs.

In one embodiment, a time for transmitting the first signal refers to a start time for transmitting the first signal.

In one embodiment, a time for transmitting the first signal refers to an end time for transmitting the first signal.

In one embodiment, a time for transmitting the first signal refers to a start time for transmitting an earliest OFDM symbol occupied by the first signal in time domain.

In one embodiment, a time for transmitting the first signal refers to a start time for transmitting an earliest OFDM symbol (comprising a Cyclic Prefix (CP)) occupied by the first signal in time domain.

In one embodiment, a time for transmitting the first signal refers to a start time for transmitting a slot to which an earliest OFDM symbol occupied by the first signal in time domain belongs.

In one embodiment, a time for transmitting the first signal refers to an SCS of a subcarrier occupied by the first signaling in frequency domain being equal to a first SCS, a start time for transmitting a slot adopting the first SCS to which an earliest OFDM symbol occupied by the first signal in time domain belongs.

In one embodiment, a time for transmitting the first signal refers to an SCS of a subcarrier occupied by the first signal in frequency domain being equal to a second SCS, a start time for transmitting a slot adopting the second SCS to which an earliest OFDM symbol occupied by the first signal in time domain belongs.

In one embodiment, a time for receiving the first signaling is earlier than a time for transmitting the first signal.

In one embodiment, a time for receiving the first signaling is not later than a time for transmitting the first signal.

In one embodiment, the above phrase of "the target time length and the common time offset being used together to determine a time interval length between a time for receiving the first signaling and a time for transmitting the first signal" includes the following meaning: the target time length and the common time offset are used together by the first node in the present disclosure to determine a time interval length between a time for receiving the first signaling and a time for transmitting the first signal.

In one embodiment, the above phrase of "the target time length and the common time offset being used together to determine a time interval length between a time for receiving the first signaling and a time for transmitting the first signal" includes the following meaning: a sum of the target time length and the common time offset is used to determine a time interval length between a time for receiving the first signaling and a time for transmitting the first signal.

In one embodiment, the above phrase of "the target time length and the common time offset being used together to determine a time interval length between a time for receiving the first signaling and a time for transmitting the first signal" includes the following meaning: a time interval length between a time for receiving the first signaling and a time for transmitting the first signal is linearly related to the target time length, and a time interval length between a time for receiving the first signaling and a time for transmitting the first signal is linearly related to the common time offset.

In one embodiment, the above phrase of "the target time length and the common time offset being used together to determine a time interval length between a time for receiving the first signaling and a time for transmitting the first signal" includes the following meaning: a sum of the target tie length and the common time offset is used to determine a difference value between an index of a downlink slot to which a latest OFDM symbol occupied by the first signaling in time domain belongs and an index of an uplink slot to which an earliest OFDM symbol occupied by the first signal in time domain belongs.

In one embodiment, the above phrase of "the target time length and the common time offset being used together to determine a time interval length between a time for receiving the first signaling and a time for transmitting the first signal" includes the following meaning: the target time length and the common time offset as well as a TA when transmitting the first signal are used together to determine a time interval length between a time for receiving the first signaling and a time for transmitting the first signal.

In one embodiment, also comprising:
receiving a fourth signal;
wherein the first signaling is used to determine time-frequency resources occupied by the fourth signal; the above phrase of "the target time length and the common time offset being used together to determine a time interval length between a time for receiving the first signaling and a time for transmitting the first signal" includes the following meaning: the target time length and the common time offset are used together to determine a time interval length between a time for receiving the fourth signal and a time for transmitting the first signal, the time interval length between the time for receiving the fourth signal and the time for transmitting the first signal is used to determine a time interval length between a time for receiving the first signaling and the time for transmitting the first signal.

In one embodiment, the above phrase of "the target time length and the common time offset being used together to determine a time interval length between a time for receiving the first signaling and a time for transmitting the first signal" includes the following meaning: a difference value of a sum of the target time length plus the common time offset minus a TA when transmitting the first signal is used to determine a time interval length between a time for receiving the first signaling and a time for transmitting the first signal.

In one embodiment, the above phrase of "the target time length and the common time offset being used together to determine a time interval length between a time for receiving the first signaling and a time for transmitting the first signal" includes the following meaning: a difference value of a sum of the target time length plus the common time offset minus a time length of at least one slot comprised in a TA when transmitting the first signal is equal to a time interval length between a time for receiving the first signaling and a time for transmitting the first signal.

Embodiment 2

Figure 2:
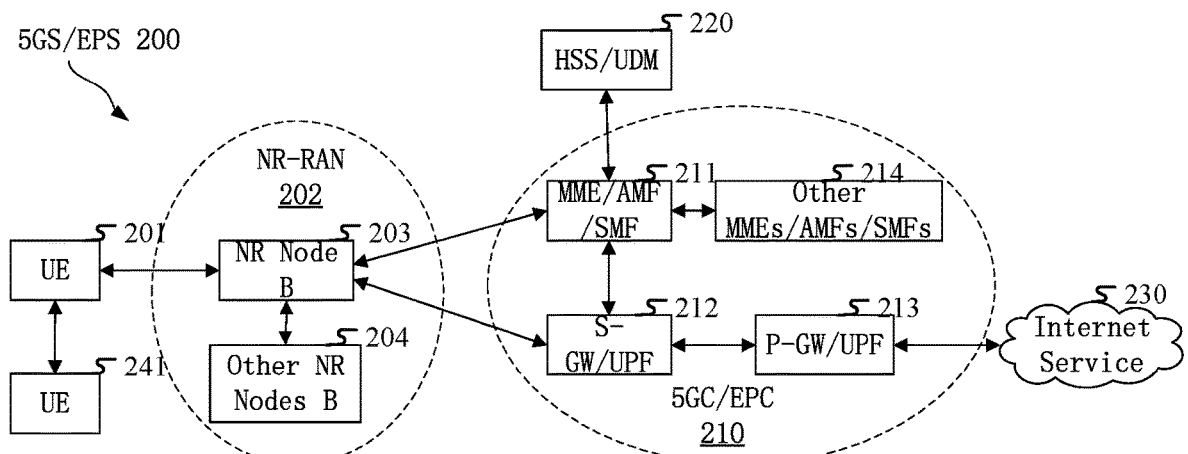
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports transmission in large transmission delay networks.

In one embodiment, the UE 201 supports transmission in networks with large-scale transmission delay differences.

In one embodiment, the UE 201 supports NTN networks.

In one embodiment, the gNB 201 corresponds to the second node in the present disclosure.

In one embodiment, the gNB 201 supports transmission in large transmission delay networks.

In one embodiment, the gNB 201 supports transmission in networks with large-scale transmission delay differences.

In one embodiment, the gNB 201 supports NTN networks.

Embodiment 3

Figure 3:
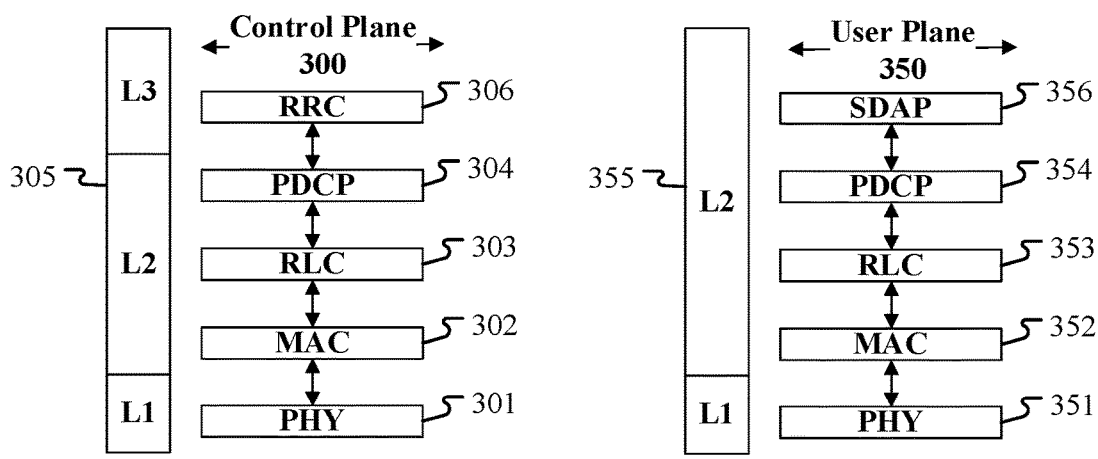
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture of the control plane 300 for a first communication node (UE, gNB or a terminal device in NTN network) and a second node (gNB, UE or a satellite or aircraft platform in NTN network) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the second signal in the present disclosure is generated by the RRC 306.

In one embodiment, the second signal in the present disclosure is generated by the MAC 302 or the MAC 352.

In one embodiment, the second signal in the present disclosure is generated by the PHY 301 or the PHY 351.

In one embodiment, the third signal in the present disclosure is generated by the RRC 306.

In one embodiment, the third signal in the present disclosure is generated by the MAC 302 or the MAC 352.

In one embodiment, the third signal in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

Embodiment 4

Figure 4:
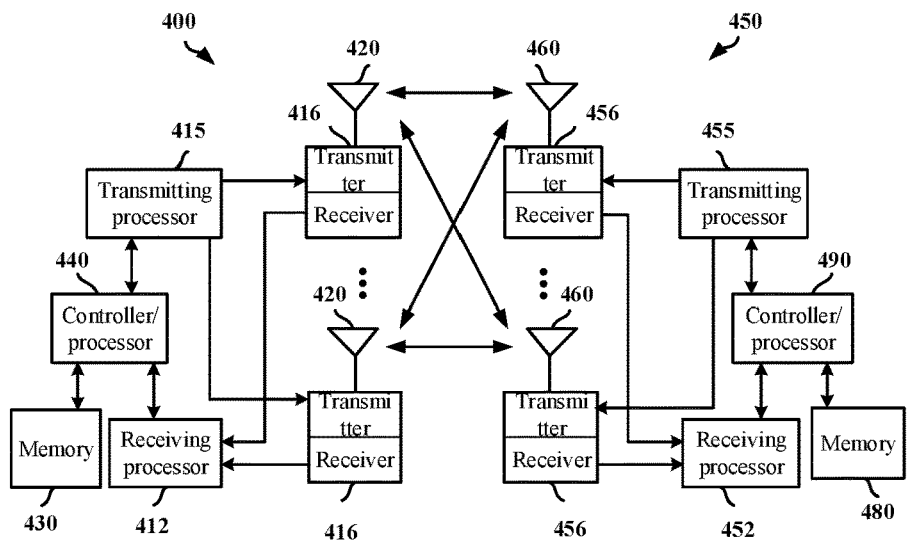
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In Downlink, a higher-layer packet, such as high-layer information comprised in the first information, the first signaling (if higher-layer information is comprised in the first signaling), the second information, the second signal and the third information in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, the first information, the first signaling (if higher layer information is comprised in the first signaling), the second information, the second signal and the third information are all generated by the controller/processor 440. The transmitting processor 415 implements various signal processing functions on the L1 layer (i.e., physical layer), including coding, interleaving, scrambling, modulation, power control/distribution, precoding, and generation of a physical-layer control signaling, etc. The generation of physical-layer signals of the first information, the first signaling, the second information, the second signal and the third information in the present disclosure are completed by the transmitting processor 415, and the transmitting processor 415 divides the generated modulation symbols into parallel streams and maps each stream to a corresponding multi-carrier subcarrier and/or a multi-carrier symbol, which are then transmitted in the form of a radio-frequency signal by the transmitting processor 415 mapping to the antenna 420 via the transmitter 416. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing functions include reception of a physical layer signal carrying the first information, the first signaling, the second information, the second signal and the third information of the present disclosure, demodulation of multicarrier symbols in multi-carrier symbol streams based on each modulation scheme (e.g., BPSK, QPSK), and then descrambling, decoding and de-interleaving of the demodulated symbols so as to recover data or control signals transmitted by the second node 410 on a physical channel, and the data or control signals are later provided to the controller/processor 490. The controller/processor 490 is in charge of the function of L2 layer and above layers, and the controller/processor 490 interprets the first information, the first signaling (if higher layer information is comprised in the first signaling), the second information, the second signal and the third information in the present disclosure. The controller/processor can be connected to a memory 480 that stores program code and data. The memory 480 may be called a computer readable medium.

In UL transmission, the data source/memory 480 provides higher-layer data to the controller/processor 490. The data source/buffer 480 represents all protocol layers of the L2 layer and above L2 layer, and the first signal and the third signal in the present disclosure are generated by the data source/buffer 480. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, retransmission of a lost packet, and a signaling to the second node 410. The transmitting processor 455 provides various signal transmitting processing functions for the L1 layer (that is, PHY). The generation of a physical layer signal carrying the first signal and the third signal in the present disclosure as well as UCI carried by the third signal in the present disclosure is completed in the transmitting processor 415. The signal transmission processing functions include coding and interleaving so as to facilitate Forward Error Correction (FEC) at the UE 450 as well as modulation of baseband signals based on various modulation schemes (i.e., BPSK, QPSK). The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing a physical layer signal carrying the first signal and the third signal in the present disclosure and processing UCI carried by the third signal, the signal receiving and processing function includes acquisition of multi-carrier symbol streams, demodulation based on each modulation scheme (i.e., BPSK, QPSK), then the decoding and de-interleaving to recover data and/or control signals originally transmitted by the first communication node 450 on the PHY. The data and the control signal are then provided to the controller/processor 440. The controller/processor 440 implements functions of L2 layer. The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives first information, the first information is used to determine a first characteristic parameter group; receives a first signaling, the first signaling is used to determine a target time length out of a first time length set; and transmits a first signal; herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the first node 450 comprises a memory that stores a computer readable instruction program. The computer readable instruction program generates an action when executed by at least one processor. The action includes: receiving first information, the first information being used to determine a first characteristic parameter group; receiving a first signaling, the first signaling being used to determine a target time length out of a first time length set; and transmitting a first signal; herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the second node 410 comprises at least one processor and at least one memory. The at least one memory comprises computer program codes; the at least one memory and the computer program codes are configured to be used in collaboration with the at least one processor. The second node 410 at least: transmits first information, the first information is used to determine a first characteristic parameter group; transmits a first signaling, the first signaling is used to determine a target time length out of a first time length set; and receives a first signal; herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the second node 410 comprises a memory that stores a computer readable instruction program. The computer readable instruction program generates an action when executed by at least one processor. The action includes: transmitting first information, the first information being used to determine a first characteristic parameter group; transmitting a first signaling, the first signaling being used to determine a target time length out of a first time length set; and receiving a first signal; herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the first node 450 is a UE.

In one embodiment, the first node 450 is a UE supporting large delay transmission.

In one embodiment, the first node 450 is a UE supporting large scale transmission delay differences.

In one embodiment, the first node 450 is a UE supporting NTN networks.

In one embodiment, the second node 410 is a base station (gNB/eNB).

In one embodiment, the second node 410 is a base station supporting large transmission delay differences.

In one embodiment, the second node 410 is a base station supporting large scale transmission delay differences.

In one embodiment, the second node 410 is a base station supporting NTN networks.

In one embodiment, the second node 410 is a satellite device.

In one embodiment, the second node 410 is flying platform equipment.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to receive the first signaling in the present disclosure.

In one embodiment, the receiver 456 (including the antenna 460), the receiving processor 452 and the controller/processor 490 are used to receive the second information in the present disclosure.

In one embodiment, the receiver 456 (including the antenna 460), the receiving processor 452 and the controller/processor 490 are used to receive the second signal in the present disclosure.

In one embodiment, the receiver 456 (including the antenna 460), the receiving processor 452 and the controller/processor 490 are used to receive the third information in the present disclosure.

In one embodiment, the transmitter 456 (including the antenna 460), the transmitting processor 455 and the controller/processor 490 are to transmit the first signal in the present disclosure.

In one embodiment, the transmitter 456 (including the antenna 460), the transmitting processor 455 and the controller/processor 490 are to transmit the third signal in the present disclosure.

In one embodiment, the transmitter 416 (including the antenna 420), the transmitting processor 415 and the controller/processor 440 are used to transmit the first information in the present disclosure.

In one embodiment, the transmitter 416 (including the antenna 420), the transmitting processor 415 and the controller/processor 440 are used to transmit the first signaling in the present disclosure.

In one embodiment, the transmitter 416 (including the antenna 420), the transmitting processor 415 and the controller/processor 440 are used to transmit the second information in the present disclosure.

In one embodiment, the transmitter 416 (including the antenna 420), the transmitting processor 415 and the controller/processor 440 are used to transmit the second signal in the present disclosure.

In one embodiment, the transmitter 416 (including the antenna 420), the transmitting processor 415 and the controller/processor 440 are used to transmit the third information in the present disclosure.

In one embodiment, the receiver 416 (including the antenna 420), the receiving processor 412 and the controller/processor 440 are used to receive the first signal in the present disclosure.

In one embodiment, the receiver 416 (including the antenna 420), the receiving processor 412 and the controller/processor 440 are used to receive the third signal in the present disclosure.

Embodiment 5

Figure 5:
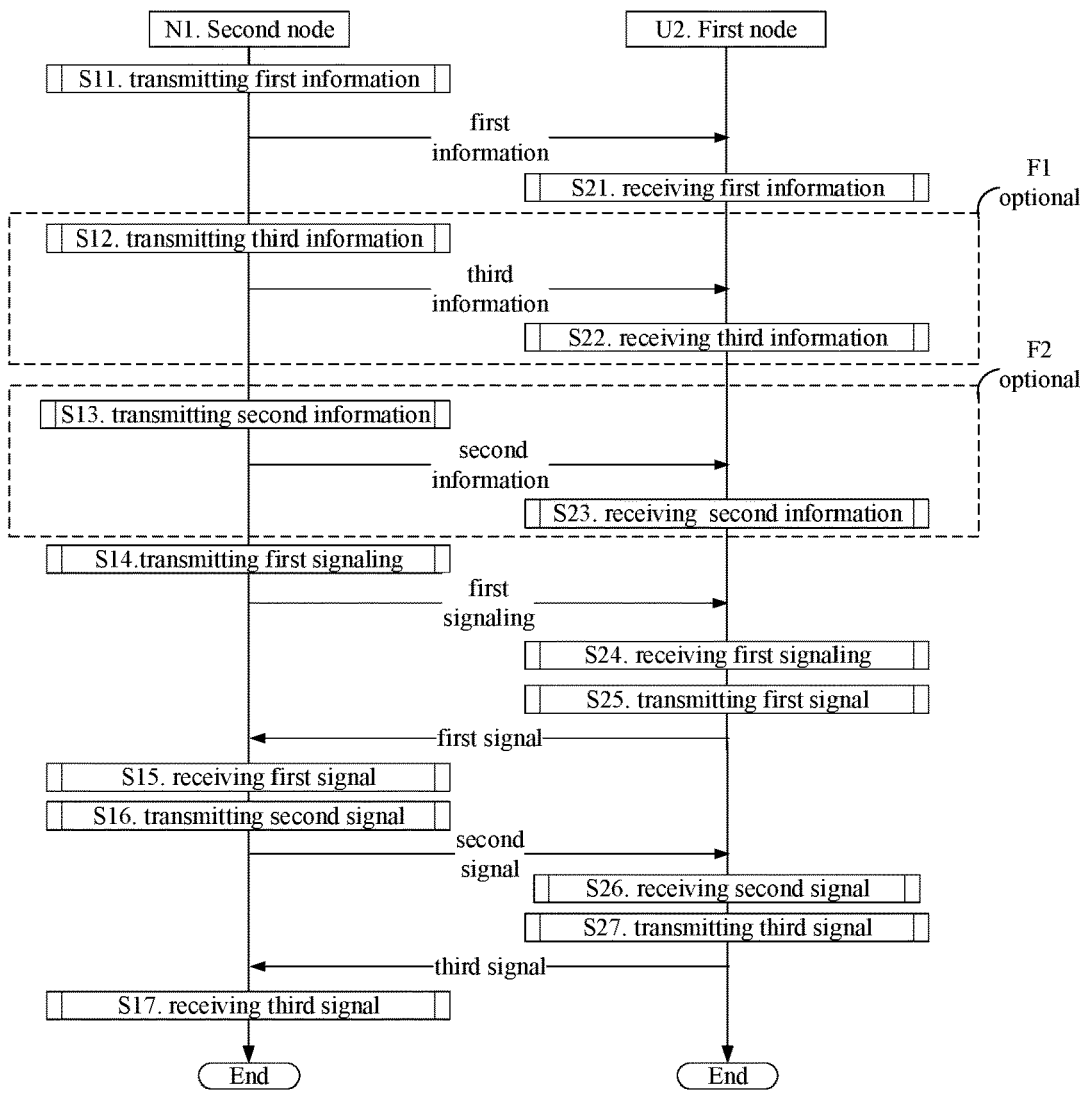
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a second node N1 is a maintenance base station of a serving cell of a first node U2, and steps in the dotted box are optional. It is particularly underlined that the order illustrated in the embodiment does not put constraints over sequences of signal transmissions and implementations.

The second node N1 transmits first information in step S11, transmits third information in step S12, transmits second information in step S13, transmits a first signaling in step S14, receives a first signal in step S15, transmits a second signal in step S16, and receives a third signal in step S17.

The first node U2 receives first information in step S21, receives third information in step S22, receives second information in step S23, receives a first signaling in step S24, transmits a first signal in step S25, receives a second signal in step S26, and transmits a third signal in step S27.

In embodiment 5, the first information in the present disclosure is used to determine a first characteristic parameter group; the first signaling in the present disclosure is used to determine a target time length out of a first time length set; and the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal in the present disclosure; the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set; the second information in the present disclosure is used to determine the P configuration combinations. the common time offset is used to determine a time interval length between an end time for receiving the second signal in the present disclosure and a start time for transmitting the third signal in the present disclosure, and the third signal carries UCI; the second signal is different from the first signaling, and the third signal is different from the first signal; when the first characteristic parameter group does not comprise the common time offset, the third information in the present disclosure is used to determine the common time offset.

In one embodiment, the third information is transmitted via an air interface.

In one embodiment, the third information is transmitted via a radio interface.

In one embodiment, the third information is transmitted through a higher-layer signaling.

In one embodiment, the third information is transmitted through a physical-layer signaling.

In one embodiment, the third information comprises all or part of a higher-layer signaling.

In one embodiment, the third information comprises all or part of a physical-layer signaling.

In one embodiment, the third information comprises all or partial Information Elements (IEs) in an RRC signaling.

In one embodiment, the third information comprises all or partial fields in an IE in an RRC signaling.

In one embodiment, the third information comprises all or partial fields in a Medium Access Control (MAC) layer signaling.

In one embodiment, the third information comprises all or part of a Master Information Block (MIB).

In one embodiment, the third information comprises all or part of an SIB.

In one embodiment, the third information comprises all or part of a MAC Control Element (CE).

In one embodiment, the third information comprises all or part of a MAC Header.

In one embodiment, the third information is transmitted through a DL-SCH.

In one embodiment, the third information is transmitted through a PDSCH.

In one embodiment, the third information is broadcast.

In one embodiment, the third information is Cell-Specific.

In one embodiment, the third information is UE-specific.

In one embodiment, the third information is UE group-specific.

In one embodiment, the third information is footprint-specific.

In one embodiment, the third information is Beam-Specific.

In one embodiment, the third signal is geographic zone-specific.

In one embodiment, the third information comprises all or partial fields of a DCI signaling.

In one embodiment, the third information and the second information are transmitted through two different signalings.

In one embodiment, the third information and the second information are transmitted through a same signaling.

In one embodiment, the third information and the second information are two different IEs of a same signaling.

In one embodiment, the third information and the second information are two different fields in a same IE in a same signaling.

In one embodiment, the phrase of "the third information being used to determine the common time offset" includes:

the third information is used by the first node in the present disclosure to determine the common time offset.

In one embodiment, the phrase of "the third information being used to determine the common time offset" includes: the third information is used to directly indicate the common time offset.

In one embodiment, the phrase of "the third information being used to determine the common time offset" includes: the third information is used to indirectly indicate the common time offset.

In one embodiment, the phrase of "the third information being used to determine the common time offset" includes: the third information is used to explicitly indicate the common time offset.

In one embodiment, the phrase of "the third information being used to determine the common time offset" includes: the third information is used to implicitly indicate the common time offset.

Embodiment 6

Figure 6:
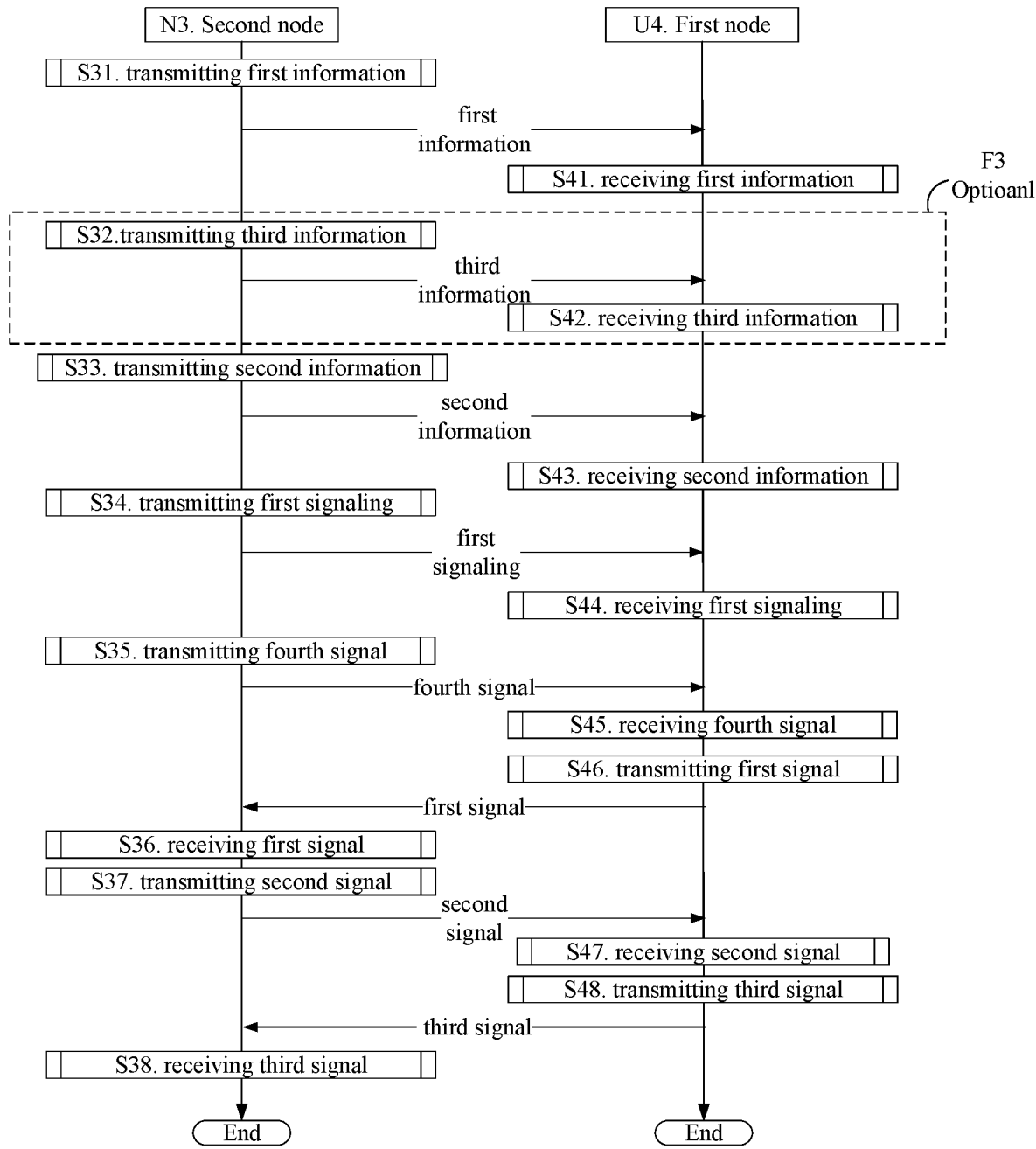
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. In FIG. 6, a second node N3 is a maintenance base station of a serving cell of a first node U4, and steps in the dotted box are optional. It is particularly underlined that the order illustrated in the embodiment does not put constraints over sequences of signal transmissions and implementations.

The second node N3 transmits first information in step S31, transmits third information in step S32, transmits second information in step S33, transmits a first signaling in step S34, transmits a fourth signal in step S35, receives a first signal in step S36, transmits a second signal in step S37, and receives a third signal in step S38.

The first node U4 receives first information in step S41, receives third information in step S42, receives second information in step S43, receives a first signaling in step S44, receives a fourth signal in step S45, transmits a first signal in step S46, receives a second signal in step S47, and transmits a third signal in step S48.

In embodiment 6, the first information in the present disclosure is used to determine a first characteristic parameter group; the first signaling in the present disclosure is used to determine a target time length out of a first time length set; and the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal in the present disclosure; the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set; the second information in the present disclosure is used to determine the P configuration combinations; the common time offset is used to determine a time interval length between an end time for receiving the second signal in the present disclosure and a start time for transmitting the third signal in the present disclosure, and the third signal carries UCI; the second signal is different from the first signaling, and the third signal is different from the first signal; when the first characteristic parameter group does not comprise the common time offset, the third information in the present disclosure is used to determine the common time offset; the first signaling is used to determine time-frequency resources occupied by the fourth signal.

In one embodiment, the target time length and the common time offset are used together to determine a time interval length between a time for receiving the fourth signal and a time for transmitting the first signal, the time interval length between the time for receiving the fourth signal and the time for transmitting the first signal is used to determine a time interval length between a time for receiving the first signaling and a time for transmitting the first signal.

In one embodiment, the fourth signal is transmitted through a PDSCH.

In one embodiment, the first signal is used to indicate whether the fourth signal is correctly received.

In one embodiment, the first signal is used to indicate whether the fourth signal is correctly decoded.

In one embodiment, the fourth signal is a CSI-RS.

In one embodiment, the fourth signal is a reference of a CSI carried by the first signal.

In one embodiment, the second information is transmitted via an air interface.

In one embodiment, the second information is transmitted via a radio interface.

In one embodiment, the second information is transmitted through a higher-layer signaling.

In one embodiment, the second information is transmitted through a physical-layer signaling.

In one embodiment, the second information comprises all or part of a higher-layer signaling.

In one embodiment, the second information comprises all or part of a physical-layer signaling.

In one embodiment, the second information comprises all or partial IEs in an RRC signaling.

In one embodiment, the second information comprises all or partial fields in an IE in an RRC signaling.

In one embodiment, the second information comprises all or partial fields in a Medium Access Control (MAC) layer signaling.

In one embodiment, the second information comprises all or part of a System Information Block (SIB).

In one embodiment, the second information comprises all or part of a MAC Control Element (CE).

In one embodiment, the second information comprises all or part of a MAC Header.

In one embodiment, the second information is transmitted through a DL-SCH.

In one embodiment, the second information is transmitted through a PDSCH.

In one embodiment, the second information is broadcast.

In one embodiment, the second information is Cell-Specific.

In one embodiment, the second information is UE-specific.

In one embodiment, the second information is UE group-specific.

In one embodiment, the second information is footprint-specific.

In one embodiment, the second information is Beam-Specific.

In one embodiment, the second signal is geographic zone-specific.

In one embodiment, the second information comprises all or partial fields of a DCI signaling.

In one embodiment, the second information comprises all or part of a "pusch-TimeDomainAllocationList".

In one embodiment, the second information comprises all or part of a "pusch-ConfigCommon".

In one embodiment, the second information comprises all or part of a "pusch-Config".

In one embodiment, the second information comprises all or part of "dl-DataToUL-ACK".

In one embodiment, the second information comprises all or part of a "CSI-Aperiodic Trigger State List".

In one embodiment, the phrase of "the second information being used to determine the P configuration combinations" includes: the second information is used by the first node in the present disclosure to determine the P configuration combinations.

In one embodiment, the phrase of "the second information being used to determine the P configuration combinations" includes: the second information is used to directly indicate the P configuration combinations.

In one embodiment, the phrase of "the second information being used to determine the P configuration combinations" includes: the second information is used to indirectly indicate the P configuration combinations.

In one embodiment, the phrase of "the second information being used to determine the P configuration combinations" includes: the second information is used to explicitly indicate the P configuration combinations.

In one embodiment, the phrase of "the second information being used to determine the P configuration combinations" includes: the second information is used to implicitly indicate the P configuration combinations.

Embodiment 7

Figures 7, 8:
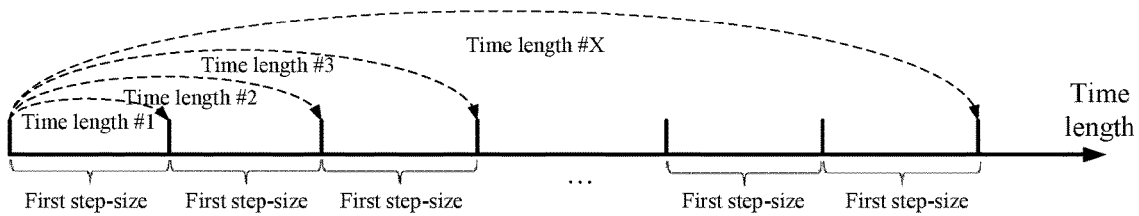
FIG. 7 illustrates a schematic diagram of P configuration combinations according to one embodiment of the pre sent disclosure.
FIG. 8 illustrates a schematic diagram of a first step-size according to one embodiment of the present disclosure.

Embodiment 7 illustrates a schematic diagram of P configuration combinations according to one embodiment of the present disclosure, as shown in FIG. 7. In FIG. 7, the first column on the left represents an index of a configuration combination, the second column on the left represents a time interval length comprised in each of the P configuration combinations, the third column on the left represents an index of a start symbol comprised in each of the P configuration combinations in a slot to which it belongs, and the fourth column on the left represents a time length occupied by each of the P configuration combinations, the blackened row represents a first index and a first configuration combination, where j is a parameter related to an SCS of a subcarrier occupied by the first signal in frequency domain.

In embodiment 7, the first signaling in the present disclosure is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length in the present disclosure is equal to a time interval length comprised in the first configuration combination; a time interval length comprised in any of the P configuration combinations is equal to a time length in the first time length set.

In one embodiment, the above phrase of "the first signaling being used to a first index" includes the following meaning: the first signaling is used by the first node in the present disclosure to determine the first index.

In one embodiment, the above phrase of "the first signaling being used to a first index" includes the following meaning: the first signaling is used to directly indicate the first index.

In one embodiment, the above phrase of "the first signaling being used to a first index" includes the following meaning: the first signaling is used to indirectly indicate the first index.

In one embodiment, the above phrase of "the first signaling being used to a first index" includes the following meaning: the first signaling is used to explicitly indicate the first index.

In one embodiment, the above phrase of "the first signaling being used to a first index" includes the following meaning: the first signaling is used to implicitly indicate the first index.

In one embodiment, the phrase in the present disclosure of "the first signaling being used to determine a target time length out of a first time length set" indicates: the first signaling is used to determine the first index.

In one embodiment, the first index is an index of a row in a mapping table.

In one embodiment, the first index is an index of the first configuration combination in the P configuration combinations.

In one embodiment, the first index is a non-negative integer.

In one embodiment, the first index is a positive integer.

In one embodiment, the P configuration combinations respectively correspond to P rows in a configuration table, and the first index is a row index of a row corresponding to the first configuration combination in the configuration table.

In one embodiment, the above phrase of "each of the P configuration combinations comprises at least a time interval length among a time interval length, an index of a start symbol in a slot to which it belongs, or an occupied time length" includes the following meaning: each of the P configuration combinations comprises a time interval length, an index of a start symbol in a slot to which it belongs and an occupied time length.

In one embodiment, the above phrase of "each of the P configuration combinations comprises at least a time interval length among a time interval length, an index of a start symbol in a slot to which it belongs, or an occupied time length" includes the following meaning: each of the P configuration combinations comprises a time interval length and an index of a start symbol in a slot to which it belongs.

In one embodiment, the above phrase of "each of the P configuration combinations comprises at least a time interval length among a time interval length, an index of a starting symbol in a slot to which it belongs, or an occupied time length" includes the following meaning: each of the P configuration combinations comprises a time interval length and an occupied time length.

In one embodiment, the above phrase of "each of the P configuration combinations comprises at least a time interval length among a time interval length, an index of a starting symbol in a slot to which it belongs, or an occupied time length" includes the following meaning: each of the P configuration combinations comprises a time interval length.

In one embodiment, the above phrase of "each of the P configuration combinations comprises at least a time interval length among a time interval length, an index of a start symbol in a slot to which it belongs, or an occupied time length" includes the following meaning: each of the P configuration combinations comprises a time interval length and a Start Length Indicator Value (SLIV).

In one embodiment, an index of a start symbol comprised in each of the P configuration combinations in a slot to which it belongs is a non-negative integer.

In one embodiment, OFDM symbols of a start symbol comprised in each of the P configuration combinations in a slot to which it belongs are sorted in a chronological order in time domain.

In one embodiment, a start symbol comprised in each of the P configuration combinations is an OFDM symbol.

In one embodiment, a time length occupied in each of the P configuration combinations is measured by ms.

In one embodiment, a time length occupied in each of the P configuration combinations is measured by s.

In one embodiment, a time length occupied in each of the P configuration combinations is represented through a number of PDSM symbols.

In one embodiment, a time length occupied in each of the P configuration combinations is represented through a number of OFDM symbols of an SCS of a subcarrier occupied by the first signal in frequency domain.

In one embodiment, each of the P configuration combinations also comprises a mapping type, and a resource mapping type adopted by the first signal is a resource mapping type comprised in a first configuration combination.

In one embodiment, any two of the P configuration combinations are different.

In one embodiment, P is not less than a number of time lengths comprised in the first time length set.

In one embodiment, P is equal to a number of time lengths comprised in the first time length set.

In one embodiment, P is greater than a number of time lengths comprised in the first time length set.

In one embodiment, the P configuration combinations are predefined.

In one embodiment, the P configuration combinations are configurable.

In one embodiment, the P configuration combinations are fixed.

In one embodiment, the P configuration combinations are configured through the second information in the present disclosure.

In one embodiment, each of the P configuration combinations corresponds to a row in a Default PUSCH time domain resource allocation table.

In one embodiment, each of the P configuration combinations corresponds to a row in a Default PUSCH time domain resource allocation B table, or each of the P configuration combinations corresponds to a row in a Default PUSCH time domain resource allocation C table, or each of the P configuration combinations corresponds to a row in a Default PUSCH time domain resource allocation D table.

Embodiment 8

Embodiment 8 illustrates a schematic diagram of a first step-size according to one embodiment of the present disclosure, as shown in FIG. 8. In FIG. 8, the horizontal axis represents time length, a length of each grid represents a first step-size, time length #1, time length #2, . . . , and time length #X are all time lengths in a first time length set.

In embodiment 8, time lengths in the first time length set in the present disclosure are sorted in order according to length, an absolute value of a difference value between any two adjacent time lengths in the first time length set is equal to a first step-size, the first step-size is equal to a positive integral number of a first slot length, and the first slot length is equal to a time length of a slot to which an OFDM symbol occupied by the first signal in the present disclosure in time domain belongs.

In one embodiment, the first step-size is a step-size in which a time length in the first time length set can be adjusted.

In one embodiment, the first step-size is equal to a minimum value of an absolute value of a difference value between any two time lengths in the first time length set.

In one embodiment, the first step-size is a granularity in which a time length in the first time length set can be adjusted.

In one embodiment, the first step-size is greater than 0.
In one embodiment, the first step-size is predefined.
In one embodiment, the first step-size is fixed.
In one embodiment, the first step-size is configurable.
In one embodiment, the first step-size is equal to the first slot length.

In one embodiment, the first step-size is equal to or greater than 1 times the first slot length.

In one embodiment, the first step-size is measured by ms.
In one embodiment, the first step-size is measured by s.
In one embodiment, the first step-size is represented by a number of slots.

In one embodiment, the first step-size is represented by a number of OFDM symbols.

In one embodiment, the above "a slot to which an OFDM symbol occupied by the first signal in time domain" corresponds to an SCS of a subcarrier occupied by the first signal in frequency domain.

In one embodiment, the above "a slot to which an OFDM symbol occupied by the first signaling in time domain" corresponds to an SCS of a subcarrier occupied by the first signaling in frequency domain.

In one embodiment, the first slot length is equal to a time length of a slot corresponding to an SCS of a subcarrier occupied by the first signal in frequency domain.

Embodiment 9

Embodiment 9 illustrates a schematic diagram of X candidate time length sets according to one embodiment of the present disclosure, as shown in FIG. 9. In FIG. 9, the first column on the left represents a first characteristic parameter group, the second column on the left represents an SCS, the third column on the left represents one of X candidate time length sets, and the blackened row of a candidate time length set represents a first time length set.

In embodiment 9, an SCS of a subcarrier occupied by the first signal in the present disclosure is used to determine the first time length set in the present disclosure out of the X candidate time length sets in the present disclosure.

In one embodiment, an SCS of a subcarrier occupied by the first signal in frequency domain is equal to one of 15 kHz, 30 kHz, 60 kHz, 120 kHz and 240 kHz.

In one embodiment, an SCS of a subcarrier occupied by the first signal in frequency domain is equal to an SCS of a subcarrier occupied by the first signaling in frequency domain.

In one embodiment, an SCS of a subcarrier occupied by the first signal in frequency domain is not equal to an SCS of a subcarrier occupied by the first signaling in frequency domain.

In one embodiment, the first signal occupies more than one subcarrier in frequency domain, and SCSs of any two subcarriers occupied by the first signal in frequency domain are equal.

In one embodiment, the first signaling occupies more than one subcarrier in frequency domain, and SCSs of any two subcarriers occupied by the first signal in frequency domain are equal.

In one embodiment, the above phrase of "an SCS of a subcarrier occupied by the first signal in frequency domain being used to determine the first time length set out of the X candidate time length sets" includes the following meaning: an SCS of a subcarrier occupied by the first signal in frequency domain is used by the first node in the present disclosure to determine the first time length set out of the X candidate time length sets.

In one embodiment, the above phrase of "an SCS of a subcarrier occupied by the first signal in frequency domain being used to determine the first time length set out of the X candidate time length sets" includes the following meaning: an SCS of a subcarrier occupied by the first signal in frequency domain is used to determine the first time length set out of the X candidate time length sets according to a given mapping relation.

In one embodiment, the above phrase of "an SCS of a subcarrier occupied by the first signal in frequency domain being used to determine the first time length set out of the X candidate time length sets" includes the following meaning: an SCS of a subcarrier occupied by the first signal in frequency domain is used to determine the first time length set out of the X candidate time length sets according to a given table corresponding relation.

In one embodiment, the above phrase of "an SCS of a subcarrier occupied by the first signal in frequency domain being used to determine the first time length set out of the X candidate time length sets" includes the following meaning: an SCS of a subcarrier occupied by the first signal in frequency domain and the first characteristic parameter group are used together to determine the first time length set out of the X candidate time length sets according to a given mapping relation.

In one embodiment, the above phrase of "an SCS of a subcarrier occupied by the first signal in frequency domain being used to determine the first time length set out of the X candidate time length sets" includes the following meaning: the first characteristic parameter group comprises an SCS of a subcarrier occupied by the first signal in frequency domain.

In one embodiment, a characteristic identifier carried by the first signal is also used to determine the first time length set in the present disclosure out of the X candidate time length sets in the present disclosure.

In one embodiment, a Radio Network Temporary Identity (RNTI) carried by the first signal is also used to determine the first time length set in the present disclosure out of the X candidate time length sets in the present disclosure.

In one embodiment, a search space type to which the first signaling belongs is also used to determine the first time length set in the present disclosure out of the X candidate time length sets in the present disclosure.

Embodiment 10

Embodiment 10 illustrates a schematic diagram of a first time offset according to one embodiment of the present disclosure, as shown in FIG. 10. In FIG. 10, the first column on the left represents an SCS, the second column on the left represents a time offset, and the blackened row represents an SCS of a subcarrier occupied by a first signal in frequency domain and a first time offset.

In embodiment 10, the first signal in the present disclosure is used for a random access, an SCS of a subcarrier occupied by the first signal in frequency domain is used to determine a first time offset, and the first time offset is used to determine a time interval length between a time for receiving the first signaling in the present disclosure and a time for transmitting the first signal.

In one embodiment, the above phrase of "the first signal being used for a random access" includes the following meaning: the first signal is used for 4-step random access.

In one embodiment, the above phrase of "the first signal being used for a random access" includes the following meaning: the first signal is used for 2-step random access.

In one embodiment, the above phrase of "the first signal being used for a random access" includes the following meaning: the first signal carries Msg3.

In one embodiment, the above phrase of "the first signal being used for a random access" includes the following meaning: the first signal carries an uplink transmission scheduled by MsgB.

In one embodiment, the above phrase of "the first signal being used for a random access" includes the following meaning: the first signal carries a retransmission of Msg3.

In one embodiment, the above phrase of "the first signal being used for a random access" includes the following meaning: the first signal carries a retransmission of an uplink transmission scheduled by MsgB.

In one embodiment, the above phrase of "the first signal being used for a random access" includes the following meaning: the first signal is an earliest uplink transmission after Msg3.

In one embodiment, the above phrase of "the first signal being used for a random access" includes the following meaning: the first signal is an earliest uplink transmission after MsgB.

In one embodiment, the above phrase of "the first signal being used for a random access" includes the following meaning: the first signal carries Msg5.

In one embodiment, the first time offset is measured by ms.

In one embodiment, the first time offset is measured by s.

In one embodiment, the first time offset is represented by a number of OFDM symbols.

In one embodiment, the first time offset is represented by a number of slots.

In one embodiment, the first time offset is equal to a time length of at least one slot corresponding to an SCS of a subcarrier occupied by the first signal in frequency domain.

In one embodiment, the first time offset is a scheduling delay other than the target time length.

In one embodiment, the first time offset is an extra time offset during a PUSCH transmission scheduled by a Random Access Response (RAR).

In one embodiment, the first time offset is an extra time offset during a PUSCH transmission scheduled by MsgB.

In one embodiment, the first time offset is a scheduling delay A other than the target time length.

In one embodiment, the above phrase of "an SCS of a subcarrier occupied by the first signal in frequency domain being used to determine a first time offset" includes the following meaning: an SCS of a subcarrier occupied by the first signal in frequency domain is used by the first node in the present disclosure to determine the first time offset.

In one embodiment, the above phrase of "an SCS of a subcarrier occupied by the first signal in frequency domain being used to determine a first time offset" includes the following meaning: the first time offset is subcarrier spacing specific.

In one embodiment, the above phrase of "an SCS of a subcarrier occupied by the first signal in frequency domain being used to determine a first time offset" includes the following meaning: an SCS of a subcarrier occupied by the first signal in frequency domain is used to determine the first time offset according to a given mapping relation.

In one embodiment, the above phrase of "an SCS of a subcarrier occupied by the first signal in frequency domain being used to determine a first time offset" includes the following meaning: an SCS of a subcarrier occupied by the first signal in frequency domain is used to determine the first time offset according to a given table corresponding relation.

In one embodiment, the first time offset is related to a processing capability of the first node.

In one embodiment, the above phrase of "the first time offset being used to determine a time interval length between a time for receiving the first signaling and a time for transmitting the first signal" includes the following meaning: the first time offset is used by the first node in the present disclosure to determine a time interval length between a time for receiving the first signaling and a time for transmitting the first signal.

In one embodiment, the above phrase of "the first time offset being used to determine a time interval length between a time for receiving the first signaling and a time for transmitting the first signal" includes the following meaning: the first time offset is used to determine a time interval length between a time for receiving the first signaling and a time for transmitting the first signal according to an operating function.

In one embodiment, the above phrase of "the first time offset being used to determine a time interval length between a time for receiving the first signaling and a time for transmitting the first signal" includes the following meaning: the first time offset and the target time length as well as the common time offset are used together to determine a time interval length between a time for receiving the first signaling and a time for transmitting the first signal.

In one embodiment, the above phrase of "the first time offset being used to determine a time interval length between a time for receiving the first signaling and a time for transmitting the first signal" includes the following meaning: a sum of the first time offset and the target time length as well as the common time offset are used to determine a time interval length between a time for receiving the first signaling and a time for transmitting the first signal.

In one embodiment, the above phrase of "the first time offset being used to determine a time interval length between a time for receiving the first signaling and a time for transmitting the first signal" includes the following meaning: a time interval length between a time for receiving the first signaling and a time transmitting the first signal is linearly related to the first time offset.

In one embodiment, the above phrase of "the first time offset being used to determine a time interval length between a time for receiving the first signaling and a time for transmitting the first signal" includes the following meaning: a difference value obtained by a sum of the first time offset plus the target time length plus the common time offset minus a time length of an integral number of slot(s) comprised in a TA when transmitting the first signal is used to determine a time interval length between a time for receiving the first signaling and a time for transmitting the first signal.

Embodiment 11

Figure 11:
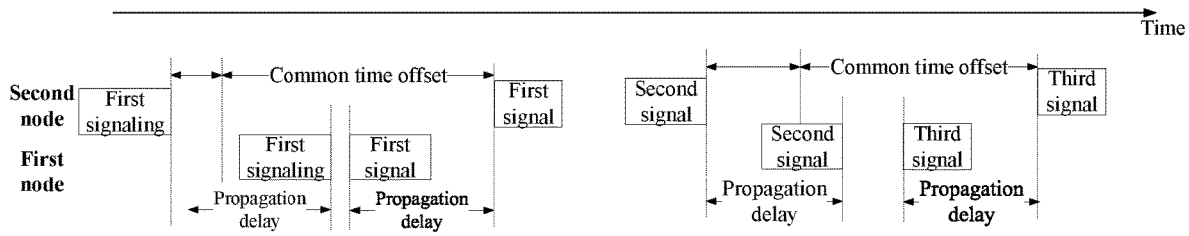
FIG. 11 illustrates a schematic diagram of a common time offset according to one embodiment of the present disclosure.

Embodiment 11 illustrates a schematic diagram of a common time offset according to one embodiment of the present disclosure, as shown in FIG. 11. In FIG. 11, the horizontal axis represents time, the upper represents a signal transmitted or received at a second node, and the lower represents a signal transmitted or received at a first node, and a delay of a same signal or signaling between the first node and the second node is a propagation delay.

In embodiment 11, the common time offset in the present disclosure is used to determine a time interval length between an end time for receiving the second signal in the present disclosure and a start time for transmitting the third signal in the present disclosure, and the third signal carries UCI; the second signal is different from the first signaling in the present disclosure, and the third signal is different from the first signal in the present disclosure.

In one embodiment, the second signal is a baseband signal.

In one embodiment, the second signal is a radio-frequency signal.

In one embodiment, the second signal is transmitted via an air interface.

In one embodiment, the second signal is transmitted via a radio interface.

In one embodiment, the second signal is a downlink transmission of the first node after completing a random access procedure.

In one embodiment, the second signal is transmitted through a DL-SCH.

In one embodiment, the second signal is transmitted through a PDSCH.

In one embodiment, the second signal is transmitted through a Physical Downlink Control Channel (PDCCH).

In one embodiment, the second signal carries a Channel Status Information Reference Signal (CSI-RS).

In one embodiment, the second signal carries all or partial bits in a DCI format.

In one embodiment, the second signal carries DCI.

In one embodiment, all or partial a bit block carrying a DCI is used to generate the second signal.

In one embodiment, all or partial bits in a Transport Block (TB) are used to generate the second signal.

In one embodiment, all or partial bits in a DCI payload is are used to generate the second signal.

In one embodiment, the second signal carries a physical-layer signaling.

In one embodiment, the second signal does not carry a physical-layer signaling.

In one embodiment, the second signal carries only a higher-layer signaling.

In one embodiment, the second signal carries only higher-layer information.

In one embodiment, the second signal carries a CSI request.

In one embodiment, the third signal is a baseband signal.

In one embodiment, the third signal is a radio frequency signal.

In one embodiment, the third signal is transmitted via an air interface.

In one embodiment, the third signal is transmitted via a radio interface.

In one embodiment, the third signal is an uplink transmission later than Msg3.

In one embodiment, the third signal is an uplink transmission later than MsgB.

In one embodiment, the third signal is an uplink transmission of the first node after completing a random access procedure.

In one embodiment, the third signal is transmitted through a UL-SCH.

In one embodiment, the third signal is piggybacked through a PUSCH.

In one embodiment, the third signal is transmitted through a PUCCH.

In one embodiment, the third signal is transmitted through an SRS.

In one embodiment, the third signal is a UCI piggybacked into a PUSCH.

In one embodiment, the third signal is transmitted through a UL DMRS.

In one embodiment, an SCS of a subcarrier occupied by the third signal in frequency domain is equal to an SCS of a subcarrier occupied by the first signal in frequency domain.

In one embodiment, an SCS of a subcarrier occupied by the third signal in frequency domain is not equal to an SCS of a subcarrier occupied by the first signal in frequency domain.

In one embodiment, the third signal and the first signal belong to a same Uplink Bandwidth Part (UL BWP).

In one embodiment, the third signal and the first signal respectively belong to different UL BWPs.

In one embodiment, UCI carried by the third signal comprises a HARQ-ACK.

In one embodiment, UCI carried by the third signal comprises CSI.

In one embodiment, all or part of a Transport Block is used to generate the third signal.

In one embodiment, UCI carried by the third signal is physical-layer information.

In one embodiment, all or part of a bit block carrying UCI is used to generate the third signal.

In one embodiment, a waveform adopted by the third signal is an OFDM.

In one embodiment, a waveform adopted by the third signal is a DFT-s-OFDM.

In one embodiment, a waveform adopted by the third signal is the same as a waveform adopted by the first signal.

In one embodiment, a waveform adopted by the third signal is different from a waveform adopted by the first signal.

In one embodiment, the second signal is used to schedule the third signal.

In one embodiment, the second signal is used to trigger the third signal to carry CSI.

In one embodiment, the second signal is used to determine UCI carried by the third signal.

In one embodiment, time-frequency resources occupied by the second signal comprise CSI reference resources as UCI carried by the third signal.

In one embodiment, the third signal is used to indicate whether the second signal is correctly received.

In one embodiment, the third signal is used to indicate whether the second signal is correctly decoded.

In one embodiment, the third signal is used to indicate whether a CRC check of the second signal is passed.

In one embodiment, the third signal carries a HARQ-ACK of the second signal.

In one embodiment, an end time for receiving the second signal refers to an end time for receiving a latest OFDM symbol occupied by the second signal in time domain.

In one embodiment, an end time for receiving the second signal refers to an end time for receiving a slot to which a latest OFDM symbol occupied by the second signal in time domain belongs.

In one embodiment, an end time for receiving the second signal refers to an end time for receiving a slot adopting an SCS of a subcarrier occupied by the second signal in frequency domain to which a latest OFDM symbol occupied by the second signal in time domain belongs.

In one embodiment, an end time for receiving the second signal refers to an end time for receiving a slot adopting an SCS of a subcarrier occupied by the third signal in frequency domain to which a latest OFDM symbol occupied by the second signal in time domain belongs.

In one embodiment, a start time for transmitting the third signal refers to a start time for transmitting an earliest OFDM symbol occupied by the third signal in time domain.

In one embodiment, a start time for transmitting the third signal refers to a start time for transmitting a CP of an earliest OFDM symbol occupied by the third signal in time domain.

In one embodiment, a start time for transmitting the third signal refers to a start time for transmitting a slot to which an earliest OFDM symbol occupied by the third signal in time domain belongs.

In one embodiment, a start time for transmitting the third signal refers to a start time for transmitting a slot adopting an SCS of a subcarrier occupied by the third signal in frequency domain to which an earliest OFDM symbol occupied by the third signal in time domain belongs.

In one embodiment, a start time for transmitting the third signal refers to a start time for transmitting a slot adopting an SCS of a subcarrier occupied by the second signal in frequency domain to which an earliest OFDM symbol occupied by the third signal in time domain belongs.

In one embodiment, the above phrase of "the common time offset being used to determine a time interval length between an end time for receiving the second signal and a start time for transmitting the third signal" includes the following meaning: the common time offset is used by the first node in the present disclosure to determine a time interval length between an end time for receiving the second signal and a start time for transmitting the third signal.

In one embodiment, the above phrase of "the common time offset being used to determine a time interval length between an end time for receiving the second signal and a start time for transmitting the third signal" includes the following meaning: the common time offset is used to determine a time interval length between an end time for receiving the second signal and a start time for transmitting the third signal according to a given operating function.

In one embodiment, the above phrase of "the common time offset being used to determine a time interval length between an end time for receiving the second signal and a start time for transmitting the third signal" includes the following meaning: a time interval length between an end time for receiving the second signal and a start time for transmitting the third signal is linearly correlated with the common time offset.

In one embodiment, the above phrase of "the common time offset being used to determine a time interval length between an end time for receiving the second signal and a start time for transmitting the third signal" includes the following meaning: a sum of the common time offset and another time length is used to determine a time interval length between an end time for receiving the second signal and a start time for transmitting the third signal.

In one embodiment, the above phrase of "the second signal being different form the first signaling" includes the following meaning: time-frequency resources respectively occupied by the second signal and the first signaling are different.

In one embodiment, the above phrase of "the second signal being different form the first signaling" includes the following meaning: the second signal and the first signaling are independent of each other.

In one embodiment, the above phrase of "the second signal being different form the first signaling" includes the following meaning: the second signal is unrelated to the first signaling.

In one embodiment, the above phrase of "the second signal being different form the first signaling" includes the following meaning: information respectively carried by the second signal and the first signaling are different.

In one embodiment, the above phrase of "the second signal being different form the first signaling" includes the following meaning: a TB is used to generate the second signal, and a bit block carrying all or partial bits in a DCI payload is used to generate the first signaling.

In one embodiment, the above phrase of "the second signal being different form the first signaling" includes the following meaning: the second signal is transmitted through a PDSCH, and the first signaling is transmitted through a PDCCH.

In one embodiment, the above phrase of "the second signal being different form the first signaling" includes the following meaning: a characteristic sequence is used to generate the second signal, and a bit block carrying all or partial bits in a DCI payload is used to generate the first signaling.

In one embodiment, the above phrase of "the second signal being different form the first signaling" includes the following meaning: the second signal is transmitted through a CSI-RS, and the first signaling is transmitted through a PDCCH.

In one embodiment, the above phrase of "the second signal being different form the first signaling" includes the following meaning: a DCI format of a DCI carried by the second signal is different from a DCI format of a DCI carried by the first signaling.

In one embodiment, the above phrase of "the second signal being different form the first signaling" includes the following meaning: the second signal carries a CSI request, and the first signaling carries scheduling information of a PUSCH.

In one embodiment, the above phrase of "the third signal being different form the first signal" includes the following meaning: time-frequency resources occupied by the third signal are different from time-frequency resources occupied by the first signal.

In one embodiment, the above phrase of "the third signal being different form the first signal" includes the following meaning: the third signal and the first signal are independent of each other.

In one embodiment, the above phrase of "the third signal being different form the first signal" includes the following meaning: the third signal is unrelated to the first signal.

In one embodiment, the above phrase of "the third signal being different form the first signal" includes the following meaning: the third signal carries UCI, and the first signal does not carry UCI.

In one embodiment, the above phrase of "the third signal being different form the first signal" includes the following meaning: the first signal also carries UCI, and a type of UCI carried by the third signal is different from a type of UCI carried by the first signal.

In one embodiment, the above phrase of "the third signal being different form the first signal" includes the following meaning: the first signal also carries UCI, UCI carried by the third signal comprises a HARQ-ACK, and UCI carried by the first signal does not comprise a HARQ-ACK.

In one embodiment, the above phrase of "the third signal being different form the first signal" includes the following meaning: the third signal also carries UCI, UCI carried by the third signal comprises CSI, and UCI carried by the first signal does not comprise CSI.

In one embodiment, the above phrase of "the third signal being different form the first signal" includes the following meaning: a bit block carrying partial or all UCI is used to generate the third signal, and all or partial bits in a TB are used for the first signal.

In one embodiment, the above phrase of "the third signal being different form the first signal" includes the following meaning: the third signal piggybacks UCI, and the first signal does not piggyback UCI.

In one embodiment, the above phrase of "the third signal being different form the first signal" includes the following meaning: the third signal is transmitted through a PUCCH, and the first signal is transmitted through a PUSCH.

In one embodiment, the above phrase of "the third signal being different form the first signal" includes the following meaning: a bit block carrying partial or all UCI and a TB are used together to generate the third signal, and all or partial bits in only one TB are used for the first signal.

Embodiment 12

Figure 12:
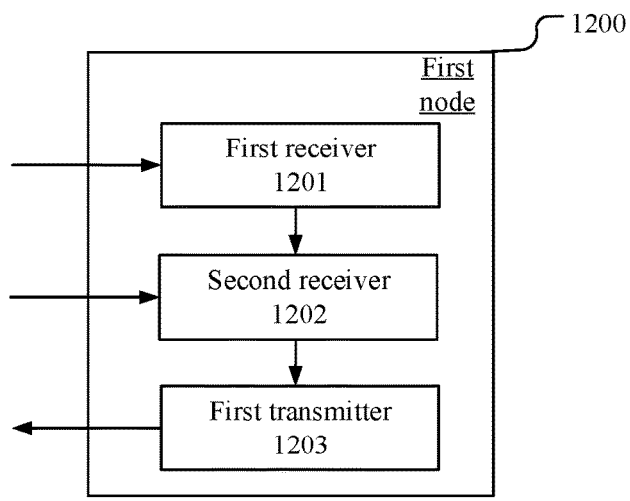
FIG. 12 illustrates a structure block diagram of a processing device in a first node according to one embodiment of the present disclosure.

Embodiment 12 illustrates the structure block diagram of a processing device in a first node, as shown in FIG. 12. In FIG. 12, a processing device 1200 of a first node comprises a first receiver 1201, a second receiver 1202 and a first transmitter 1203. The first receiver 1201 comprises the transmitter/receiver 456 (including the antenna 460), the receiving processor 452 and the controller/processor 490 in FIG. 4 of the present disclosure; the second receiver 1202 comprises the transmitter/receiver 456 (including the antenna 460), the receiving processor 452 and the controller/processor 490 in FIG. 4 of the present disclosure; the first transmitter 1203 comprises the transmitter/receiver 456 (including the antenna 460), the transmitting processor 455 and the controller/processor 490 in FIG. 4 of the present disclosure.

In embodiment 12, the first receiver 1201 receives first information, the first information is used to determine a first characteristic parameter group; the second receiver 1202 receives a first signaling, the first signaling is used to determine a target time length out of a first time length set;

and the first transmitter 1203 transmits a first signal; herein, the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set.

In one embodiment, the second receiver 1202 receives second information, the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set, and the second information is used to determine the P configuration combinations.

In one embodiment, time lengths in the first time length set are sorted in order of length, and an absolute value of a difference value between any two adjacent time lengths in the first time length set is equal to a first step-size, the first step-size is equal to a positive integral number of a first slot length, and the first slot length is equal to a time length of a slot to which an OFDM symbol occupied by the first signal in time domain belongs.

In one embodiment, an SCS of a subcarrier occupied by the first signal in frequency domain is used to determine the first time length set out of the X candidate time length sets.

In one embodiment, the first signal is used for a random access, an SCS of a subcarrier occupied by the first signal in frequency domain is used to determine a first time offset, and the first time offset is used to determine a time interval length between a time for receiving the first signaling and a time for transmitting the first signal.

In one embodiment, the second receiver 1202 receives a second signal, and the first transmitter 1203 transmits a third signal; herein, the common time offset is used to determine a time interval length between an end time for receiving the second signal and a start time for transmitting the third signal, and the third signal carries UCI; the second signal is different from the first signaling, and the third signal is different from the first signal.

In one embodiment, when the first characteristic parameter group does not comprise the common time offset, the first receiver 1201 receives third information; herein, the third information is used to determine the common time offset.

Embodiment 13

Figure 13:
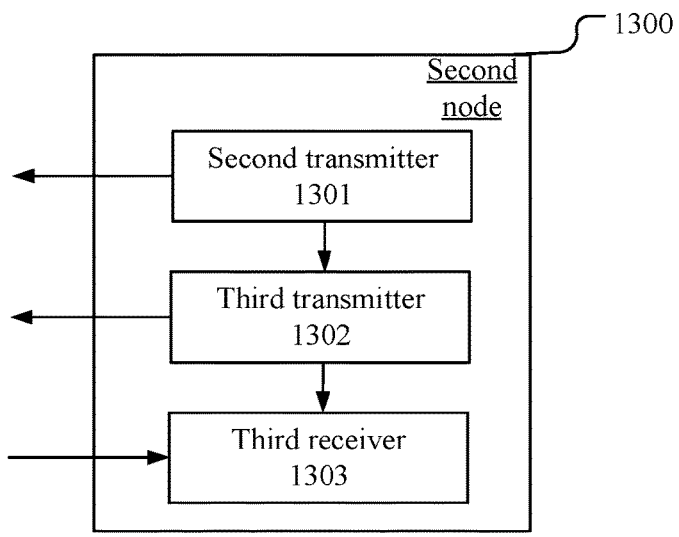
FIG. 13 illustrates a structure block diagram of a processing device in second node according to one embodiment of the present disclosure.

Embodiment 13 illustrates the structure block diagram of a processing device in a second node, as shown in FIG. 13. In FIG. 13, a processing device 1300 of the second node comprises a second transmitter 1301, a third transmitter 1302 and a third receiver 1303. The second transmitter 1301 comprises the transmitter/receiver 416 (including the antenna 460), the transmitting processor 415 and the controller/processor 440 in FIG. 4 of the present disclosure; the third transmitter 1302 comprises the transmitter/receiver 416 (including the antenna 460), the transmitting processor 415 and the controller/processor 440 in FIG. 4 of the present disclosure; and the third receiver 1303 comprises the transmitter/receiver 416 (including the antenna 420), the receiving processor 412 and the controller/processor 440 in FIG. 4 of the present disclosure.

In embodiment 13, the second transmitter 1301 transmits first information, and the first information is used to determine a first characteristic parameter group; the second transmitter 1302 transmits a first signaling, and the first signaling is used to determine a target time length out of a first time length set; and the third receiver 1303 receives a first signal; the first characteristic parameter group comprises at least one of a type of a transmitter of the first information, a height of a transmitter of the first information or a common time offset; the first time length set is one of X candidate time length sets, X being a positive integer greater than 1; the first characteristic parameter group is used to determine the first time length set out of the X candidate time length sets; any of the X candidate time length sets comprises more than one time length, and the target time length is a time length in the first time length set; the target time length and the common time offset are used together to determine a time interval length between a time for receiving the first signaling and a time for transmitting the first signal.

In one embodiment, the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set.

In one embodiment, the second transmitter 1301 transmits second information; the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set, and the second information is used to determine the P configuration combinations.

In one embodiment, time lengths in the first time length set are sorted in order of length, an absolute value of a difference value between any two adjacent time lengths in the first time length set is equal to a first step-size, the first step-size is equal to a positive integral number of a first slot length, and the first slot length is equal to a time length of a slot to which an OFDM symbol occupied by the first signal in time domain belongs.

In one embodiment, an SCS of a subcarrier occupied by the first signal in frequency domain is used to determine the first time length set out of the X candidate time length sets.

In one embodiment, the first signal is used for a random access, an SCS of a subcarrier occupied by the first signal in frequency domain is used to determine a first time offset, and the first time offset is used to determine a time interval length between a time for receiving the first signaling and a time for transmitting the first signal.

In one embodiment, the third transmitter 1302 transmits a second signal; the third receiver 1303 receives a third signal; the common time offset is used to determine a time interval length between an end time for receiving the second signal and a start time for transmitting the third signal, and the third signal carries UCI; the second signal is different from the first signaling, and the third signal is different from the first signal.

In one embodiment, when the first characteristic parameter group does not comprise the common time offset, the second transmitter 1301 transmits third information; herein, the third information is used to determine the common time offset.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving first information, the first information being used to determine a first characteristic parameter group;
a second receiver, receiving a first signaling, the first signaling being used to determine a target time length out of a first time length set; and
a first transmitter, transmitting a first signal, wherein the first signal carries Uplink Control Information (UCI) of physical layer;
wherein:
the first characteristic parameter group comprises at least one of a type of a transmitter of the first information, a height of a transmitter of the first information or a common time offset;
the first time length set is one of X candidate time length sets, X being a positive integer greater than 1;
the type of the transmitter of the first information is used to determine the first time length set out of the X candidate time length sets;
any of the X candidate time length sets comprises more than one time length, and the target time length is a time length in the first time length set; and
the target time length and the common time offset are used together to determine a time interval length between a time for receiving the first signaling and a time for transmitting the first signal.

2. The first node according claim 1, wherein the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set.

3. The first node according to claim 2, wherein the second receiver receives second information; wherein the second information is used to determine the P configuration combinations.

4. The first node according to claim 1, wherein time lengths in the first time length set are sorted in order of length, an absolute value of a difference value between any two adjacent time lengths in the first time length set is equal to a first step-size, the first step-size is equal to a positive integral number of a first slot length, and the first slot length is equal to a time length of a slot to which an Orthogonal Frequency Division Multiplexing (OFDM) symbol occupied by the first signal in time domain belongs.

5. The first node according to claim 1, wherein the second receiver receives a second signal, and the first transmitter transmits a third signal; wherein the common time offset is used to determine a time interval length between an end time for receiving the second signal and a start time for transmitting the third signal, and the third signal carries Uplink Control Information (UCI); the second signal is different from the first signaling, and the third signal is different from the first signal.

6. The first node according to claim 1, wherein when the first characteristic parameter group does not comprise the common time offset, the first receiver receives third information; wherein the third information is used to determine the common time offset.

7. The first node according to claim 1, wherein the second receiver receives a fourth signal; wherein the first signaling is used to determine time-frequency resources occupied by the fourth signal; the target time length and the common time offset are used together to determine a time interval length between a time for receiving the fourth signal and the time for transmitting the first signal, the time interval length between the time for receiving the fourth signal and the time for transmitting the first signal is used to determine a time interval length between a time for receiving the first signaling and the time for transmitting the first signal.

8. A second node for wireless communications, comprising:
   a second transmitter, transmitting first information, the first information being used to determine a first characteristic parameter group;
   a third transmitter, transmitting a first signaling, the first signaling being used to determine a target time length out of a first time length set; and
   a third receiver, receiving a first signal, the first signal carries Uplink Control Information (UCI) of physical layer; wherein:
   the first characteristic parameter group comprises at least one of a type of a transmitter of the first information, a height of a transmitter of the first information or a common time offset;
   the first time length set is one of X candidate time length sets, X being a positive integer greater than 1;
   the type of the transmitter of the first information is used to determine the first time length set out of the X candidate time length sets;
   any of the X candidate time length sets comprises more than one time length, and the target time length is a time length in the first time length set;
   the target time length and the common time offset are used together to determine a time interval length between a time for receiving the first signaling and a time for transmitting the first signal.

9. The second node according to claim 8, wherein the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set.

10. The second node according to claim 9, wherein the second transmitter transmits second information; wherein the second information is used to determine the P configuration combinations.

11. The second node according to claim 8, wherein time lengths in the first time length set are sorted in order of length, an absolute value of a difference value between any two adjacent time lengths in the first time length set is equal to a first step-size, the first step-size is equal to a positive integral number of a first slot length, and the first slot length is equal to a time length of a slot to which an OFDM symbol occupied by the first signal in time domain belongs.

12. The second node according to claim 8, wherein the third transmitter transmits a second signal, and the third receiver receives a third signal; wherein the common time offset is used to determine a time interval length between an end time for receiving the second signal and a start time for transmitting the third signal, and the third signal carries UCI; the second signal is different from the first signaling, and the third signal is different from the first signal.

13. The second node according to claim 8, wherein the third transmitter transmits a fourth signal; wherein the first signaling is used to determine time-frequency resources occupied by the fourth signal; the target time length and the common time offset are used together to determine a time interval length between a time for receiving the fourth signal and the time for transmitting the first signal, the time interval length between the time for receiving the fourth signal and the time for transmitting the first signal is used to determine a time interval length between a time for receiving the first signaling and the time for transmitting the first signal.

14. A method in a first node for wireless communications, comprising:
   receiving first information, the first information being used to determine a first characteristic parameter group;
   receiving a first signaling, the first signaling being used to determine a target time length out of a first time length set;
   transmitting a first signal, the first signal carries Uplink Control Information (UCI) of physical layer; wherein:
   the first characteristic parameter group comprises at least one of a type of a transmitter of the first information, a height of a transmitter of the first information or a common time offset; the first time length set is one of X candidate time length sets, X being a positive integer greater than 1;
   the type of the transmitter of the first information is used to determine the first time length set out of the X candidate time length sets;
   any of the X candidate time length sets comprises more than one time length, and the target time length is a time length in the first time length set;
   the target time length and the common time offset are used together to determine a time interval length between a time for receiving the first signaling and a time for transmitting the first signal.

15. A method in a first node according to claim 14, wherein the first signaling is used to determine a first index, and the first index is an index of a first configuration combination, the first configuration combination is one of P configuration combinations, P being a positive integer greater than 1; each of the P configuration combinations comprises at least a time interval length among a time interval length, an index of a start symbol in a slot to which it belongs or an occupied time length, and the target time length is equal to a time interval length comprised in the first configuration combination; a time interval length comprised in any of the P configuration combinations is equal to a time length in the first time length set.

16. The method in a first node according to claim 15 comprising:
   receiving second information;
   wherein the second information is used to determine the P configuration combinations.

17. The method in a first node according to claim 14, wherein time lengths in the first time length set are sorted in order of length, an absolute value of a difference value between any two adjacent time lengths in the first time length set is equal to a first step-size, the first step-size is equal to a positive integral number of a first slot length, and the first slot length is equal to a time length of a slot to which an Orthogonal Frequency Division Multiplexing (OFDM) symbol occupied by the first signal in time domain belongs.

18. The method in a first node according to claim 14, comprising:
   receiving a second signal; and
   transmitting a third signal;
   wherein the common time offset is used to determine a time interval length between an end time for receiving the second signal and a start time for transmitting the third signal, and the third signal carries Uplink Control Information (UCI); the second signal is different from the first signaling, and the third signal is different from the first signal.

19. The method in a first node according to claim 14, wherein when the first characteristic parameter group does not comprise the common time offset, the first receiver receives third information; wherein the third information is used to determine the common time offset.

20. The method in a first node according to claim 14, comprising:
   receiving a fourth signal;
   wherein the first signaling is used to determine time-frequency resources occupied by the fourth signal; the target time length and the common time offset are used together to determine a time interval length between a time for receiving the fourth signal and the time for transmitting the first signal, the time interval length between the time for receiving the fourth signal and the time for transmitting the first signal is used to determine a time interval length between a time for receiving the first signaling and the time for transmitting the first signal.

* * * * *